United States Patent
Itoh et al.

(10) Patent No.: US 8,996,160 B2
(45) Date of Patent: Mar. 31, 2015

(54) ARTICLE STORAGE DEVICE AND CONVEYOR USED THEREIN

(75) Inventors: Kazuo Itoh, Kasai (JP); Shigeki Fukata, Kasai (JP)

(73) Assignee: Itoh Denki Co., Ltd. (JP)

( * ) Notice: Subject to any disclaimer, the term of this patent is extended or adjusted under 35 U.S.C. 154(b) by 410 days.

(21) Appl. No.: 13/252,389

(22) Filed: Oct. 4, 2011

(65) Prior Publication Data
US 2012/0160637 A1 Jun. 28, 2012

(30) Foreign Application Priority Data
Dec. 27, 2010 (JP) ................................. 2010-291171

(51) Int. Cl.
*B65G 43/08* (2006.01)
*B65G 1/02* (2006.01)
*B65G 13/06* (2006.01)

(52) U.S. Cl.
CPC ................ *B65G 1/023* (2013.01); *B65G 13/06* (2013.01); *B65G 43/08* (2013.01)
USPC ...................... 700/230; 198/781.05

(58) Field of Classification Search
CPC ......... B65G 43/08; B65G 1/023; B65G 13/06
USPC ................................................. 198/781.05
See application file for complete search history.

(56) References Cited

U.S. PATENT DOCUMENTS

| | | | | |
|---|---|---|---|---|
| 3,731,824 A | * | 5/1973 | Howlett | 414/267 |
| 3,837,511 A | * | 9/1974 | Howlett | 414/807 |
| 4,781,286 A | * | 11/1988 | Weaver | 198/789 |
| 4,802,094 A | * | 1/1989 | Nakamura et al. | 700/115 |
| 5,333,983 A | * | 8/1994 | Hatouchi et al. | 414/331.06 |
| 5,564,879 A | * | 10/1996 | Noguchi | 414/268 |
| 6,860,381 B2 | * | 3/2005 | Newsom et al. | 198/781.05 |
| 7,017,730 B2 | * | 3/2006 | Mills et al. | 198/368 |
| 7,542,823 B2 | * | 6/2009 | Nagai | 700/230 |
| 8,494,673 B2 | * | 7/2013 | Miranda et al. | 700/216 |
| 2002/0103569 A1 | * | 8/2002 | Mazur | 700/216 |
| 2004/0111339 A1 | * | 6/2004 | Wehrung et al. | 705/30 |
| 2006/0289273 A1 | * | 12/2006 | Knepple et al. | 198/460.1 |
| 2007/0225858 A1 | * | 9/2007 | Martin et al. | 700/213 |
| 2009/0299521 A1 | * | 12/2009 | Hansl et al. | 700/215 |
| 2012/0219397 A1 | * | 8/2012 | Baker | 414/796 |

FOREIGN PATENT DOCUMENTS

JP 2002-347914 12/2002

* cited by examiner

*Primary Examiner* — Gene Crawford
*Assistant Examiner* — Thomas Randazzo
(74) *Attorney, Agent, or Firm* — Wood, Phillips, Katz, Clark & Mortimer

(57) ABSTRACT

An article storage device for storing a plurality of pallets and having a plurality of storage compartments includes a conveyor for conveying the pallets, the conveyor being divided into a plurality of control zones corresponding to the respective storage compartments and having controllers in the respective zones. At least the controllers in the zones between the both end control zones each have a motor functioning also as an arrival detector, a RAM, and a communication circuit, the motor being for detecting a pallet being entering the home control zone, the RAM being for memorizing information indicating whether a pallet exists in the home control zone, and the communication circuit being for transmitting the information to the controller in the downstream zone. The controllers each contain a program to move up the pallet to the downstream zone so as to store the pallet.

28 Claims, 17 Drawing Sheets

ARTICLE STORAGE DEVICE AND CONVEYOR USED THEREIN

TECHNICAL FIELD

The present invention relates to article storage devices, more particularly to an article storage device for storing a plurality of articles and having a plurality of storage compartments arranged in series, and also to a conveyor used in the article storage device.

BACKGROUND ART

In facilities such as distribution centers or large warehouses, acres of articles are handled on a daily basis. A large warehouse, for example, has large-scaled rack frames arranged in a plurality of rows. Such a rack frame is elongated, stretching over 10 meters in length, and has a plurality of rows of rack shelves.

Generally, in such facilities, palletized articles are loaded into and/or unloaded from a rack frame having a plurality of rows of rack shelves by a self-propelled carrier such as a forklift (self-propelled material handling equipment). The depth of each rack shelf into and from which a forklift can load and unload articles is limited by a length of forks of the forklift, being no more than the depth of one pallet. As a result, articles are inevitably loaded into and unloaded from a rack frame from a front side perpendicular to its longitudinal direction.

This renders rack frames unable to be arranged without space between the frames and requires passages between the frames through which the forklift moves. Hence, large warehouses according to the art need to have passages between rack frames and some facilities having a limited area easily come to face limit of a handling quantity of articles. In order to solve such a problem described above, the patent document 1 specified below discloses an article storage facility.

Specifically, the patent document 1 discloses an article storage facility having a plurality of short conveyors connected in a rack frame. The storage facility disclosed in the patent document 1 loads an article by a forklift from one side in a longitudinal direction of the rack frame and transfers the article, which has been placed on each conveyor driven by an electric motor, over the conveyors, thereby storing the article in the rack frame. The stored article is optionally unloaded from the other side in the longitudinal direction of the rack frame by a forklift. In other words, the rack frame can arrange a plurality of articles serially in its longitudinal direction, thereby dispensing with a passage between shelves, which was required before. That produces greater occupancy of articles per area in such facilities. Shortly, even facilities having limited areas can handle acres of articles.

PATENT DOCUMENT

Patent Document 1: JP 2002-347914 A

DISCLOSURE OF INVENTION

Technical Problem

However, the storage facility in the patent document 1 involves a load presence detector (sensor) for each of the short conveyors, requiring a troublesome wiring work. It also requires a wiring work of the detectors in the addition or the elimination of conveyors, which makes it difficult to change specifications (layout modification).

In view of the foregoing, the present invention aims to provide an article storage device that allows an easy wiring work and expeditious specification change (layout modification).

Solution to Problem

An aspect of the present invention provided herein to solve the above-mentioned problems and drawbacks is an article storage device for storing a plurality of articles and having a plurality of storage compartments aligned in series, including a conveyor for conveying articles, the conveyor having an article loading side, from which an article is transferred, and an article unloading side, to which an article is transferred, wherein the conveyor is designed to run at least in a direction from the loading side to the unloading side and arranged over all the storage compartments, wherein the conveyor is divided into a plurality of control zones corresponding to the respective storage compartments, the control zones consisting of a first end control zone adjacent to the loading side, a second end control zone adjacent to the unloading side, and at least one intermediate control zone between the first and the second end control zones, wherein the conveyor is provided with a controller in each of the control zones, at least the controller provided in the intermediate control zone having an arrival detector, a load-presence memorizing means, and a communication tool, the arrival detector being for detecting an article being entering a home control zone from the control zone adjacent to the loading side, the load-presence memorizing means being for memorizing information indicating whether an article exists or not in the home and/or the other control zone, the communication tool being for transmitting load presence information indicating whether an article exists or not in the home control zone to the controller in the control zone adjacent to the loading side, and wherein the conveyor further includes load presence detectors provided in at least the first and the second end control zones, so that articles are moved up to the unloading side and stored in the device.

The article storage device in this aspect includes a conveyor for conveying articles. The conveyor runs at least in a direction from an article loading side to an article unloading side. The conveyor has a plurality of storage compartments aligned in series and is divided into a plurality of control zones corresponding to the respective storage compartments. The first and the second end control zones (the most upstream and downstream control zones) each are provided with a load presence detector. On the other hand, the intermediate control zone between the first and the second end control zones dispenses with such a load presence detector.

This is attributed to a controller provided in the intermediate control zone.

Specifically, the controller for controlling the intermediate control zone is designed to detect arrival of an article with an arrival detector at the zone, memorize load presence information indicating whether an article exists or not in the zone with a load-presence memorizing means, and transmit the load presence information to the controller in the upstream control zone adjacent to the loading side with a communication tool. Shortly, the controller in the intermediate control zone can hold information detected with the arrival detector in the load-presence memorizing means. Consequently, the intermediate control zone is not necessary to watch existence or nonexistence of an article with a load presence detector, which is omissible. The reduced number of load presence detectors facilitates a wiring work. Additionally, the wiring work is not difficult in any modification to the specification such as the addition or the elimination of conveyors. Thus, the load presence detectors for detecting an article are necessary to be disposed only in the first and second control zones, which are an entrance and an exit of the article storage device.

Further, the article storage device in this aspect moves up articles to the unloading side and stores the articles. Only in a case of no article in the downstream control zone adjacent to the unloading side, which is confirmed with the load-presence memorizing means and the communication tool in the controller of the upstream control zone adjacent to the loading side, articles are allowed to be automatically transferred to the respective control zone adjacent to the unloading side.

The term "move up and store" denotes that loaded articles are sequentially moved up to the downstream and empty control zones. In this invention, when a plurality of articles are moved up and stored, they are placed next to each other with the most downstream control zone adjacent to the unloading side in the lead. There is no empty control zone thereafter.

Preferably, the conveyor includes a motor and a rotary body such as a skid or a pulley working with the motor, the motor and the rotary body being arranged in each of the control zones, the arrival detector being designed to detect an article being entering the home control zone from the control zone adjacent to the loading side with an induced rotation of the rotary body in the home control zone as one condition.

This preferred aspect is one embodying the invention. In this aspect, the conveyor has a motor and a rotary body such as a skid or a pulley. The arrival detector detects an article being entering the home control zone from the control zone adjacent to the loading side with an induced rotation of the rotary body in the home control zone as one condition. A general brushless motor is, for example, provided with a rotational position detector for controlling a motor such as a Hall IC. Since the rotary body such as a skid or a pulley works with the motor, the induced rotation of the rotary body generates an output signal from the rotational position detector provided in the motor. Herein, this output signal is regarded as a detection signal of arrival of an article, so that the device dispenses with a sensor such as an infrared sensor.

Preferably, the article storage device further includes a Hall IC for detecting a rotation of the motor and generating a pulse voltage, and being designed to detect the induced rotation of the rotary body by the pulse voltage.

Preferably, the article storage device is designed to detect the induced rotation of the rotary body by a back electromotive force generated when the motor receives a rotational force.

Preferably, the article storage device further includes a carrier detector for detecting approach and/or separation of an external self-propelled carrier in each of the first and second end control zones.

In this preferred aspect, the first and the second end control zones each are provided with a carrier detector for detecting approach and/or separation of an external self-propelled carrier. Herein, the "self-propelled carrier" denotes a self-propelled material handling equipment and refers to a general forklift or the like, being another external device than the article storage device. It is possible to disable and/or enable an operation of the conveyor by detecting approach and/or separation of the external device in loading and/or unloading of articles. This constructs a fail-safe device so called an interlock circuit.

Preferably, the conveyor has the motor in each of the control zones and the article storage device is designed to make the motor in the first end control zone inoperable upon detection of approach of a part of the carrier to the first end control zone.

Preferably, the article storage device is designed to make the motor in the first end control zone operable upon detection of separation of the part of the carrier from the first end control zone.

Preferably, the article storage device is designed to transmit a stop signal to the controller in the control zone adjacent to the loading side upon detection of approach of the part of the carrier to the second end control zone.

Preferably, the article storage device is designed to transmit information of no article existing in the second end zone to the controller in the control zone adjacent to the loading side upon detection of separation of the part of the carrier from the second end control zone and detection of no article existing in the second end control zone.

Preferably, the article storage device is designed to automatically move up articles stored in the control zones to the respective control zones adjacent to the unloading side upon unloading of the article in the second end control zone.

Viewing from the second end control zone, the articles having been automatically moved up to the second end control zone in the lead are aligned in the loading order (beginning with earlier loading). This preferred aspect is one advancing the invention and generally referred to as a "first-in first-out" storage method, in which an article stored in each of the control zones are automatically moved up to the respective control zone adjacent to the unloading side when an article has been unloaded from the second end control zone.

According to this aspect, the "first-in first-out" method used in the market can be installed in advance as the basic program, for example, thereby eliminating a program input by users.

Preferably, the article storage device further includes a motor-reverse switch, the motor-reverse switch being designed to transmit a signal to the controllers, the signal being a command to transfer articles stored in the control zones to the control zones adjacent to the loading side.

This preferred aspect uses a motor-reverse switch, so as to transfer the stored article to the control zone adjacent to the loading side. That allows a mistakenly loaded article to be unloaded from the loading zone and the stored article to be unloaded in the reverse order from the loading order, which is a "last-in first-out" system.

Preferably, the controller in the intermediate control zone drives the conveyor in power activation and/or power fail recovery to press, if any, an article stored in each control zone against another article in a control zone adjacent to the unloading side so as to determine whether the article exists in the home control zone.

As described above, this invention dispenses with the load presence detector in the intermediate control zone. If and when the load presence information stored in the intermediate control zone is lost in the event of unexpected power down or power outage, it is necessary to obtain new load presence information by some means.

This preferred aspect drives the conveyor in power activation and/or power fail recovery, so as to press an article stored in the intermediate control zone (home control zone) against another article in the downstream control zone. Upon contacting with the other article, the article in the home control zone stops. Then, the conveyor is overloaded, which causes a large electric current flowing in the controller. The large electric current makes possible to detect existence of an article in the next downstream control zone.

Preferably, the conveyor includes the motor arranged in each of the control zones, being designed to detect whether the article is pressed or not against the other article by a current due to overload of the motor.

Preferably, the article storage device is designed to perform a reverse rotation of the motor if and when the article in the home control zone has been pressed against the other article so as to leave a space between the articles.

Preferably, the conveyor includes the motor arranged in each of the control zones, the controller in the intermediate control zone driving the conveyor in power activation and/or power fail recovery to determine whether an article exists in the home control zone by a current in an inching or a low-speed rotation of the motor.

Preferably, the conveyor includes the motor arranged in each of the control zones, the controller stopping the motor in the second end control zone upon detection of arrival of an article in the second end control zone.

Preferably, the article storage device further includes a stopper in the second end control zone.

Another aspect of the present invention is an article storage device for storing a plurality of articles and having a plurality of storage compartments aligned in series, including a conveyor for conveying articles, the conveyor having an article loading side, from which an article is transferred, and an article unloading side, to which an article is transferred, wherein the conveyor is designed to run at least in a direction from the loading side to the unloading side and arranged over all the storage compartments, wherein the conveyor is divided into a plurality of control zones corresponding to the respective storage compartments, the control zones consisting of a first end control zone adjacent to the loading side, a second end control zone adjacent to the unloading side, and at least one intermediate control zone between the first and the second end control zones, wherein the conveyor is controlled by at least two controllers, the device further including motors each operating the respective control zones, the controllers each controlling one or more control zones in charge and being designed to discretely activate and stop the motors in the control zones in charge, at least the controller for controlling the intermediate control zone having an arrival detector, a load-presence memorizing means, and a communication tool, the arrival detector being for detecting an article being entering any of the control zones in charge from the control zone adjacent to the loading side, the load-presence memorizing means being for memorizing information indicating whether an article exists or not in any of the control zones in charge, the communication tool being for transmitting load presence information indicating whether an article exists or not in the control zone mostly adjacent to the loading side of the control zones in charge to the controller in the control zones adjacent to the loading side and/or for receiving load presence information indicating whether an article exists or not in the control zones further adjacent to the unloading side than the control zone in charge, and wherein the device further includes load presence detectors provided in at least the first and the second end control zones, so that articles are moved up to the unloading side and stored in the device.

The article storage device in this aspect has a conveyor having a different configuration from that of the foregoing article storage device. In this aspect, the conveyor is controlled by at least two controllers. Each control zone has a motor for discretely operating the respective control zone. Each of the controllers controls one or more control zones in charge and discretely activates and stops the control zones in charge. According to this aspect, it is not necessary to provide one controller in one control zone.

Still another aspect of the present invention is a conveyor having an article loading side, from which the article is transferred, and an article unloading side, to which the article is transferred, being designed to run at least in a direction from the loading side to the unloading side, and being divided into a plurality of control zones aligned in series, the control zones consisting of a first end control zone adjacent to the loading side, a second end control zone adjacent to the unloading side, and at least one intermediate control zone between the first and the second end control zones, wherein the conveyor includes a controller in each of the control zones, at least the controller provided in the intermediate control zone having an arrival detector, a load-presence memorizing means, and a communication tool, the arrival detector being for detecting an article being entering a home control zone from the control zone adjacent to the loading side, the load-presence memorizing means being for memorizing information indicating whether an article exists or not in the home control zone, the communication tool being for transmitting the load presence information to the controller in the control zone adjacent to the loading side, and wherein the conveyor further includes load presence detectors provided in at least the first and the second end control zones, so that articles are moved up to the unloading side and stored in the conveyor.

Preferably, the conveyor further includes a motor and a rotary body such as a skid or a pulley working with the motor, the motor and the rotary body being arranged in each of the control zones, the arrival detector being designed to detect an article being entering the home control zone from the control zone adjacent to the loading side with an induced rotation of the rotary body in the home control zone as one condition.

Preferably, the conveyor further includes a carrier detector for detecting approach and/or separation of an external self-propelled carrier in each of the first and second end control zones.

Preferably, the conveyor is designed to automatically move the articles stored in the control zones to the respective control zones adjacent to the unloading side upon unloading of an article in the second end control zone.

Preferably, the conveyor further includes a motor-reverse switch, the motor-reverse switch being designed to transmit a signal to the controllers, the signal being a command to transfer articles stored in the control zones to the respective control zones adjacent to the loading side.

Preferably, the controller in the intermediate control zone drives the conveyor in power activation and/or power fail recovery to press, if any, an article stored in each control zone against another article in the respective control zone adjacent to the unloading side so as to determine whether the article exists in the home control zone.

Advantageous Effect of Invention

The article storage device in this invention facilitates a wiring work and enables an expeditious specification change.

The conveyor in this invention also facilitates a wiring work and enables an expeditious specification change.

DESCRIPTION OF EMBODIMENTS

Now, an article storage device of an embodiment of the present invention will be described in detail below, making reference to the accompanying drawings. The following description is to facilitate understanding of the embodiment and this invention should not be understood with limited to the specific embodiment. The description of members in the art is omitted.

Figure 1:
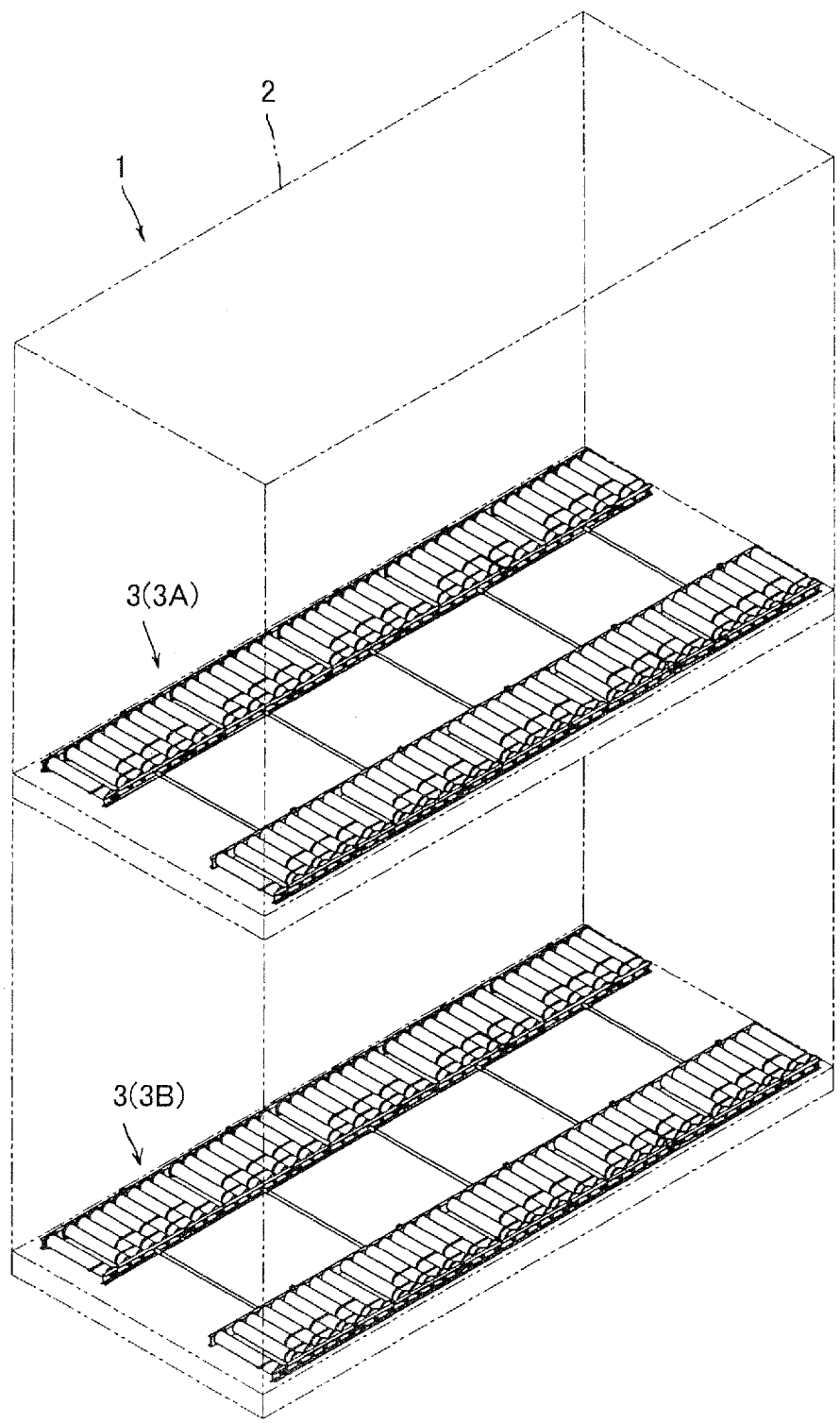
FIG. 1 is a perspective view of an article storage device of an embodiment of the present invention.

An article storage device 1 in the present embodiment is, as shown in FIG. 1, constituted by a rack 2 with two-tiered storage shelves and two conveyors 3 (3A and 3B) arranged on the respective shelves one above the other.

The rack 2 is a frame for storing pallets (articles) 80 described below and having a high rigidity, being preferably formed by a material with a high load bearing.

The conveyor 3 is a device designed to convey the pallets 80. A specific mechanical configuration of the conveyor 3 employed in the storage device 1 in this embodiment will be described later, though the mechanical configuration of the conveyor 3 will be now modeled on a simple conveyor.

Firstly, a characteristic electrical configuration of the conveyor 3 in the storage device 1 employed in this embodiment will be described below.

Figure 2:
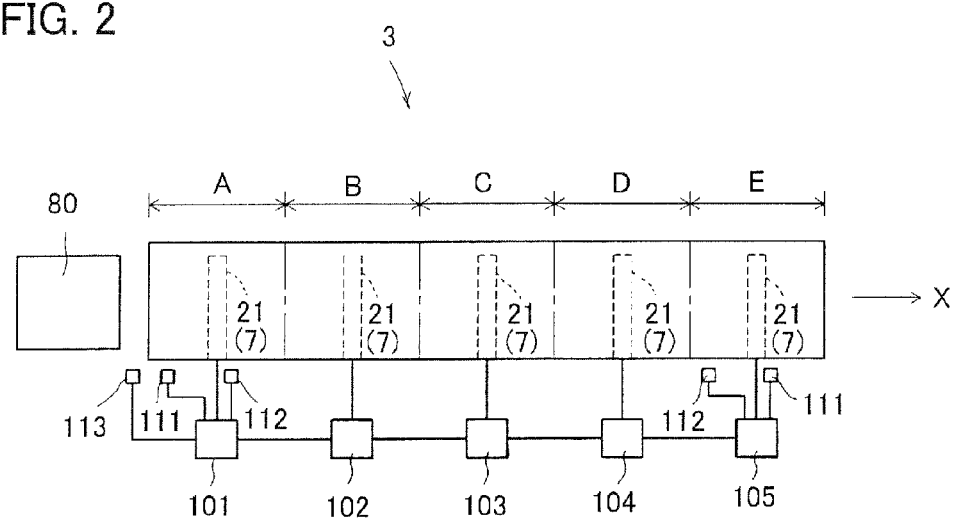
FIG. 2 is an explanatory plan view of a conveyor used in the storage device in FIG. 1.

The storage device 1 mainly consists of a plurality of storage compartments A to E aligned in series. Referring to FIG. 2, the conveyor 3 is arranged over the compartments A to E.

Each of the compartments A to E is for accommodating one pallet 80. Thus, the storage device 1 can accommodate five pallets 80 in series.

In this embodiment, the compartments A to E are applied to respective control zones A to E. An article is transferred in a direction X that is from a loading side for receiving the article to an unloading side for unloading the article from the conveyor. In other words, the pallet 80 is transferred from the control zone A to the control zone E in the direction X, which is a traveling direction. Specifically, a very basic traveling is in such a manner that the pallet 80 having been loaded into the control zone A is transferred in the control zones B to D in order, then being unloaded from the storage device 1 through the control zone E. The control zone A is a control zone positioned at a proximal end into which an article is loaded (the most upstream), functioning as a "loading zone". The control zones B to D are control zones positioned in an intermediate region, functioning as a "storage zone". The control zone E is a control zone positioned at a distal end from which the article is unloaded (the most downstream), functioning as an "unloading zone".

The control zones A to E respectively include motors 21, each of which is incorporated in a roller (motorized roller 7), and controllers 101 to 105. The motors 21 of the control zones A to E are connected to the controllers 101 to 105, respectively. The controllers 101 to 105 are connected next to each other.

Herein, there are provided adjacent to the control zone A a proximity switch (a carrier detector) 111, an infrared sensor (load presence detector) 112, and a motor-reverse switch 113, which are connected to the controller 101. There are provided adjacent to the control zone E another proximity switch 111, another infrared sensor 112, which are connected to the controller 105.

Figure 3:
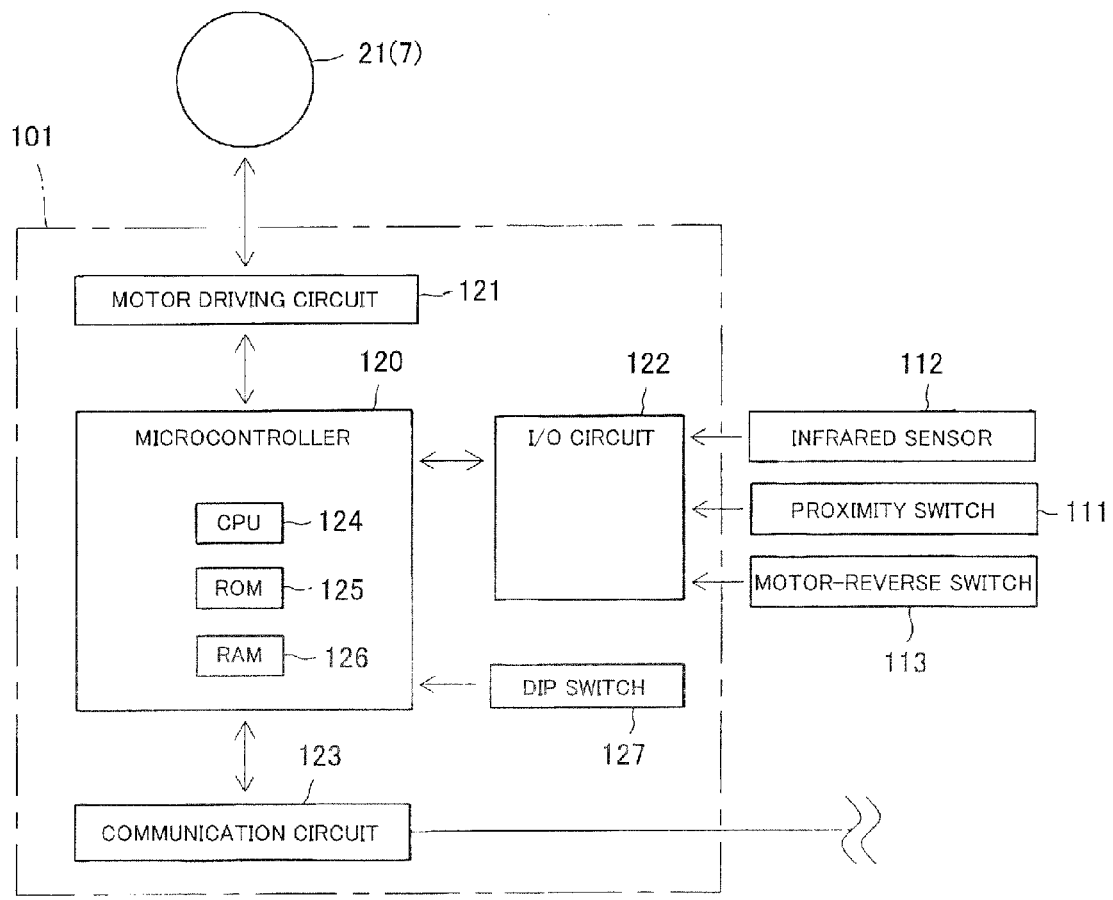
FIG. 3 is a block diagram of a controller for controlling a loading zone in the conveyor in FIG. 2.

The controller 101 disposed in the "loading zone", as shown in FIG. 3, includes a microcontroller 120, a motor driving circuit 121, an I/O circuit 122, a communication circuit 123, and a DIP switch 127.

The microcontroller 120 is an integrated circuit equipped with known components including a CPU 124, a ROM 125, and a RAM (load presence memorizing means) 126.

The CPU 124 is a central processing unit that executes a control program, instructions, or the like, being a so-called processor.

The ROM 125 is a storage medium that is constituted by memories such as EEPROM or flash memory and can store data such as a control program.

The RAM 126 is a storage memory constituted by memories such as SRAM or DRAM, being a so-called main memory. The RAM 126 can store data such as "load presence information" described above. More specifically, the RAM 126 can store information indicating whether an article exists in its home control zone and/or other control zones. Hereinafter, the home control zone denotes a control zone in which the controller in question is disposed.

The ROM 125 stores the following basic program: Upon confirmation of arrival of one pallet 80 at the home control zone (control zone A), "load presence information" indicating whether another pallet 80 exists in a downstream control zone (control zone B) adjacent to the unloading side in the traveling direction X is confirmed. In a case of no pallet 80 (being "empty"), the one pallet 80 is transferred to the downstream control zone (control zone B).

The ROM 125 further stores the following program: Upon reception of information that the downstream control zone adjacent to the unloading side in the traveling direction X has become "empty", in a case where one pallet 80 exists in the home control zone, the pallet 80 is made transferred to the downstream control zone. This program is a so-called "first-in first-out" program.

The ROM 125 further stores the following program as a safety circuit for the controller 101: Upon detection of approach of a part (e.g. metallic forks) of an external self-propelled carrier such as a forklift to the home control zone (control zone A), the motor 21 in the control zone A is made inoperable. Shortly, that protects the pallet 80 from mistakenly moving during working using the carrier, being an interlock circuit. The ROM 125 still further stores the following program: Upon detection of separation of a part (e.g. metallic forks) of an external self-propelled carrier such as a forklift from the home control zone (control zone A), the motor 21 in the control zone A is made operable. Shortly, confirmation of separation of the carrier breaks the interlock circuit and restarts the "first-in first-out" program.

The motor driving circuit 121 is a known driver that can control the motor 21 (the motorized roller 7). The circuit 121, for example, can turn on/off the motor 21 and adjust the speed of the motor 21.

The I/O circuit 122 is an interface circuit for transmitting and receiving signals between an external device, to the I/O circuit 122 the proximity switch 111, the infrared sensor 112, and the motor-reverse switch 113 are connected.

The proximity switch 111 is a contactless magnetic sensor for detecting approach/separation of metallic members, so as to detect approach/separation of a part (e.g. metallic forks) of an external self-propelled carrier such as a forklift to/from the home control zone (control zone A).

The infrared sensor 112 is a contactless sensor that can detect existence or nonexistence of an article. The infrared sensor 112 has a light emitting part and a light receiving part and receives infrared light emitted from the light emitting part and reflected on an article, so as to detect existence or nonexistence of the article.

The motor-reverse switch 113 is a known push-button switch that can transmit a signal for changing a conveying direction of the pallet 80 in the opposite direction from the traveling direction X.

The communication circuit 123 is a circuit for communicating with the other controller. The communication circuit 123 is connected to the downstream controller 102 adjacent to the unloading side in the traveling direction X, so as to receive "load presence information" indicating whether the pallet 80 exists in the downstream control zone B adjacent to the unloading side in the traveling direction X from the controller 102 controlling the control zone B.

The DIP switch 127 is a manual switch for switching settings. In this embodiment, an operation of the DIP switch 127 switches a storage method of the pallet 80 between the "first-in first-out" method and another method, switches the conveying direction, switches the conveying speed, and so on. Further, the DIP switch 127 is operated so that the controller 101 is applied to a controller for controlling the "storage zone". Alternatively, the DIP switch 127 is operated so that the controller 101 is applied to a controller for controlling the "unloading zone".

Figure 4:
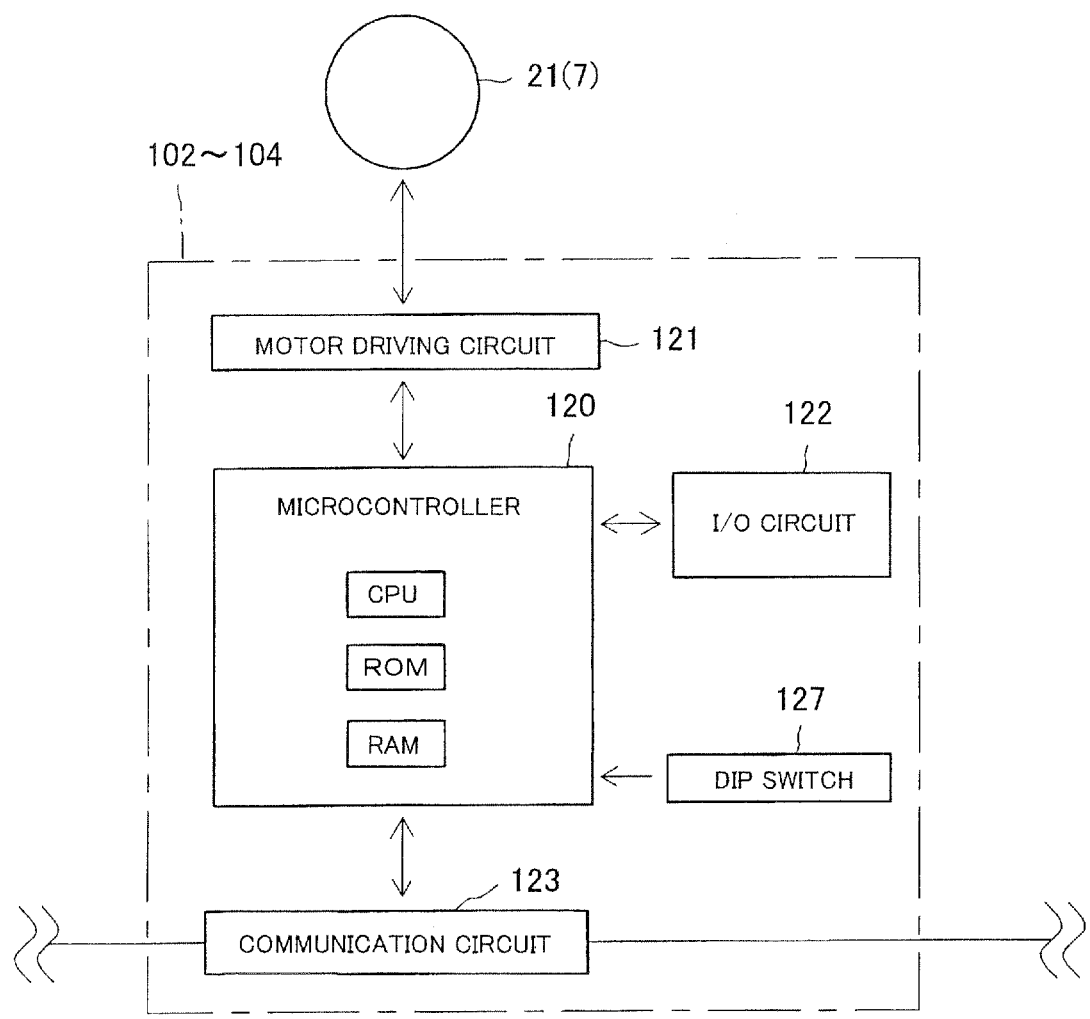
FIG. 4 is a block diagram of a controller for controlling a storage zone in the conveyor in FIG. 2.

The controllers 102 to 104 disposed in the "storage zone", as shown in FIG. 4, each include a microcontroller 120, a motor driving circuit 121, an I/O circuit 122, a communication circuit 123, and a DIP switch 127. Shortly, the controllers 102 to 104 each have the same basic configuration as that of the controller 101, and thus the description will be partly omitted.

The communication circuit 123 provided in each of the controllers 102 to 104 is connected to the downstream and upstream controllers from its home control zone adjacent to the unloading side and to the loading side in the traveling direction X. Each of the controllers 102 to 104 receives "load presence information" indicating whether the pallet 80 exists in the downstream control zone adjacent to the unloading side from the downstream controller. On the other hand, each of those transmits "load presence information" indicating whether the pallet 80 exists in its home control zone to the upstream controller adjacent to the loading zone.

Referring to FIG. 2, the controller 102 (control zone B) is next to the controller 103 (control zone C) adjacent to the unloading side and to the controller 101 (control zone A) adjacent to the loading side. Similarly, the controller 103 (control zone C) is next to the controller 104 (control zone D) adjacent to the unloading side and to the controller 102 (control zone B) adjacent to the loading side. Still similarly, the controller 104 (control zone D) is next to the controller 105 (control zone E) adjacent to the unloading side and to the controller 103 (control zone C) adjacent to the loading side.

In the controllers 102 to 104, none is connected to the I/O circuit 122. Specifically, the controllers 102 to 104 are not provided with the infrared sensor 112 (load presence detector) unlike the controller 101. In each of the controllers 102 to 104, whether the pallet 80 exists in the home control zone (control zone B to D) is confirmed by detection of movement of the pallet 80 with the motor 21.

More specifically, the pallet 80 having been transferred from the upstream control zone adjacent to the loading side to the home control zone induces the motor 21 in the home control zone to rotate by friction. A Hall IC (not shown) incorporated in the motor 21 for controlling the motor 21 generates a pulse voltage upon detection of rotation of the motor 21. The home control zone receives the pulse voltage (output signal) via the motor driving circuit 121 with the microcontroller 120, so as to detect arrival of the pallet 80 at the home control zone. This is attributed to application of the motor 21 to an "arrival detector". In other words, the motor 21 functions also as the arrival detector.

Alternatively, a back electromotive force generated when the motor 21 is induced to rotate may be used as a detection signal The detected information is retained as "load presence information" by storing the information in the RAM 126. In each of the controllers 102 to 104, the ROM 125 stores the following program so as to transmit the "load presence information" stored in the RAM 126 to the upstream controller adjacent to the loading side: Upon confirmation of arrival of the pallet 80 at the home control zone, the controller transmits the "load presence information" of the home control zone to the upstream control zone adjacent to the loading side. The controllers 102 to 104 each also store the basic program and the "first-in first-out" program similar to that in the controller 101.

The controllers 102 to 104 are not provided with the infrared sensor 112 or the like. Therefore, the ROM 125 previously stores a compliant program against potential loss of "load presence information" of the home control zone in the event of an unexpected power down or power outage. The compliant program performs the following operation: The controller drives the motor 21 in the home control zone in power activation or power fail recovery, so as to transfer the pallet 80 placed on the home control zone to the downstream zone adjacent to the unloading side. Then, when the motor 21 is overloaded, the controller determines that the pallet 80 exists in the home control zone. Shortly, when the pallet 80 placed on the home control zone has been brought into contact with the other pallet 80 placed on the downstream control zone adjacent to the unloading side, the motor 21 has been overloaded, which causes a high current flowing in the motor driving circuit 121, and whereby the controller determines load existence.

Alternatively, it is possible to determine existence of the pallet 80 by a current value measured in an inching of or a low-speed rotation of the motor 21 instead of the overloading of the motor 21.

Herein, it is possible to perform a control making a gap between the pallets 80 by a slight reverse rotation of the motor 21 after bringing one pallet 80 placed on the home control zone into contact with another pallet 80 placed on the downstream control zone adjacent to the unloading side.

Figure 5:
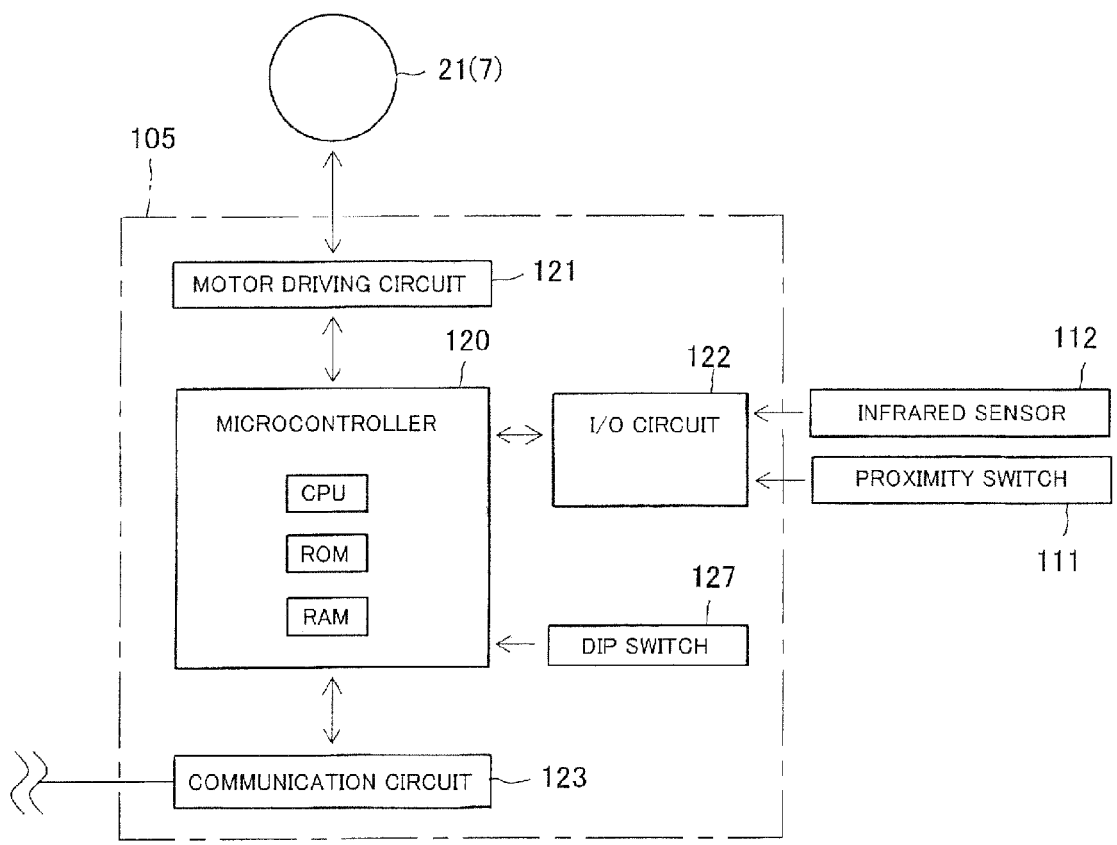
FIG. 5 is a block diagram of a controller for controlling an unloading zone in the conveyor in FIG. 2.

The controller 105 disposed in the "unloading zone", as shown in FIG. 5, includes a microcontroller 120, a motor driving circuit 121, an I/O circuit 122, a communication circuit 123, and a DIP switch 127. In short, the controller 105 also has the same basic configuration as that of the above-mentioned controller 101, and thus, the description will be partly omitted. To the I/O circuit 122 the proximity switch 111 and the infrared sensor 112 are connected as well as the controller 101.

The controller 105 is disposed in the "unloading zone" adjacent to the most downstream in the traveling direction X (a distal end adjacent to the unloading side). Therefore, no controller is disposed in its downstream. When one pallet 80 is transferred to the control zone E from the loading side (upstream), the pallet 80 needs to be stopped and stored in the home control zone (control zone E). In order to do that, the ROM 125 in the controller 105 stores the following program as a basic program: Upon confirmation of arrival of the pallet 80 in the home control zone (control zone E), the motor 21 is brought to a stop. This is to protect the pallet 80 from falling out of the conveyor 3 due to a rotation of the motor 21 by force malfunctioned. The arrival of the pallet 80 is confirmed with the infrared sensor 112.

The ROM 125 in the controller 105 further stores the following program: Upon detection of approach of a part (e.g. metallic forks) of an external self-propelled carrier such as a forklift to the home control zone (control zone E), the controller 105 transmits a stop signal to the upstream controller adjacent to the loading side. Shortly, the stop signal is transmitted to the upstream controller adjacent to the loading side, thereby preventing conveyance of another pallet 80 to the home control zone from the upstream control zone during working using the carrier, being an interlock circuit.

The ROM 125 in the controller 105 still further stores the following program: Upon detection of separation of a part (e.g. metallic forks) of an external self-propelled carrier such as a forklift from the home control zone (control zone E) and detection of nonexistence of the pallet 80, information that the home control zone has no pallet (being "empty"). Shortly, confirmation of separation of the carrier breaks the interlock circuit and restarts the "first-in first-out" program.

Now, an operation to move a pallet forward by the conveyor in this embodiment will be described with reference to FIGS. 6A to 6E.

Figure 6A:
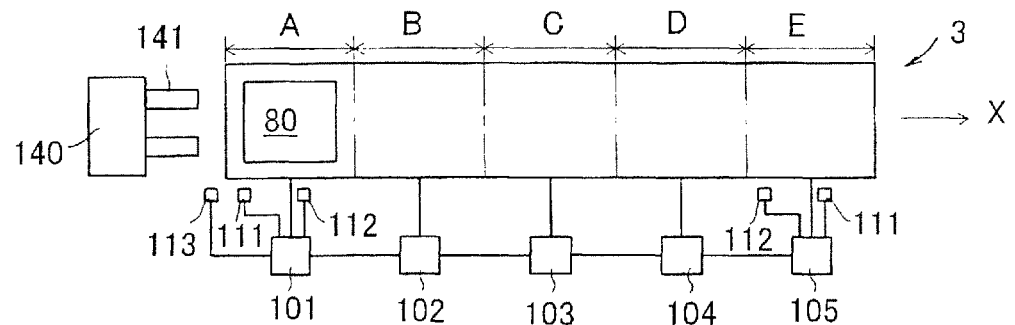
FIGS. 6A to 6E are explanatory diagrams illustrating states of the conveyor, the device performing an operation to move forward a pallet from a control zone A to a control zone E.

In FIG. 6A, one pallet 80 has been loaded in the control zone A, which is the "loading zone". Since a forklift 140 having metallic forks 141 is separated from the control zone A, the proximity switch 111 is disabled and the interlock circuit is broken.

The controller 101 starts an operation based on the stored program. The controller 101 detects that the pallet 80 has been loaded in the control zone A with the infrared sensor 112.

The controller 101 receives "load presence information" of the downstream control zone B adjacent to the unloading side from the controller 102. Since the control zone B is "empty", the "load presence information" indicating "empty" has been transferred from the controller 102 to the controller 101. As a result, the controller 101 transfers the pallet 80 from the control zone A to the downstream control zone B based on the "first-in first-out" program.

Figure 6B:
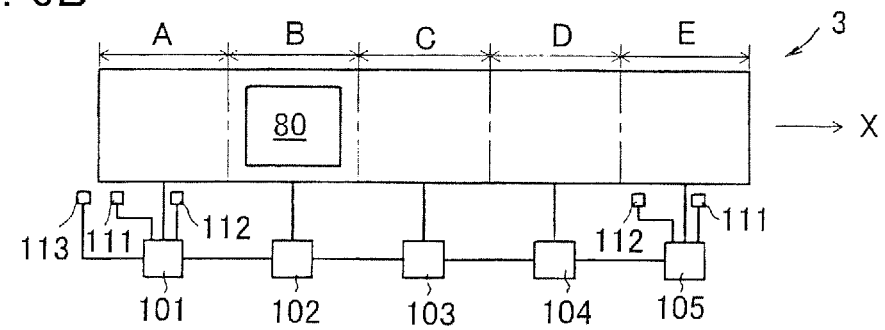

In FIG. 6B, the pallet 80 having been transferred from the control zone A induces the motor 21 in the control zone B to rotate. A back electromotive force generated in the motor 21 makes the controller 102 to detect arrival of the pallet 80 in the control zone B. At this time, in the controller 102, the RAM 126 memorizes the "load presence information".

Then, the controller 102 receives "load presence information" of the downstream control zone C adjacent to the unloading side from the controller 103. Since the control zone C is "empty", the load presence information indicating "empty" has been transmitted from the controller 103 to the controller 102. As a result, the controller 102 transfers the pallet 80 from the control zone B to the downstream control zone C adjacent to the unloading side based on the basic program.

Figure 6C:
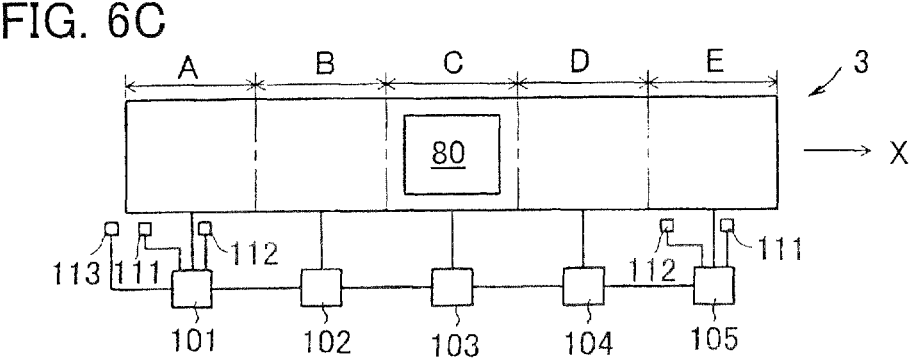
Figure 6D:
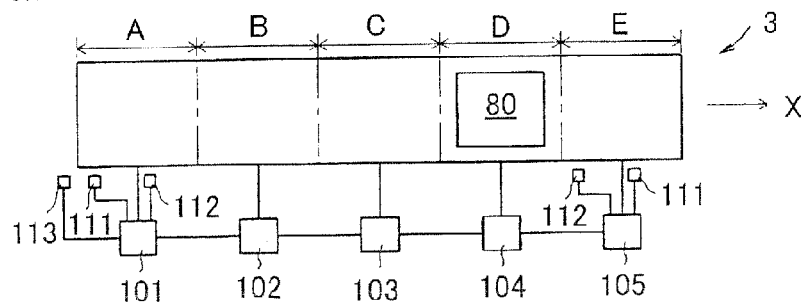

In FIGS. 6C to 6D, the controllers 103 and 104 perform the same operations as that performed by the controller 102. As a result, the pallet 80 is transferred via the control zones C and D to the control zone E.

Figure 6E:
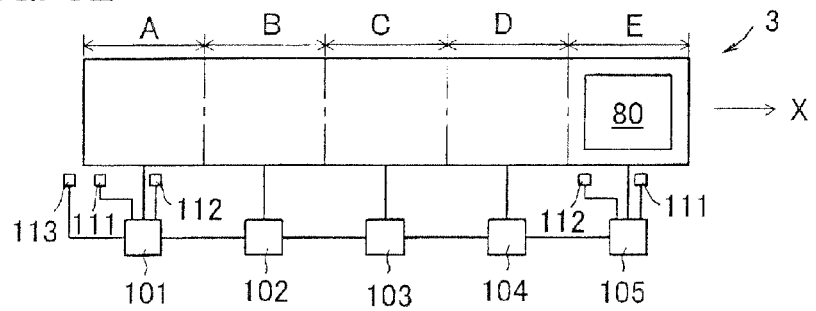

In FIG. 6E, the controller 105 detects that the pallet 80 has arrived at the control zone E with the infrared sensor 112. Since the control zone E is located at the distal end adjacent to the unloading side (the most downstream), the controller 105 brings the motor 21 to a stop and stores the pallet 80 in the control zone E based on the stored program.

As described above, only by being loaded in the control zone A, the pallet 80 is automatically transferred from the control zone A to the control zone E and stored in the control zone E by the controllers 101 to 105 based on the stored programs. In other words, the pallet 80 moved forward within the conveyor 3.

Herein, also in a case where the pallet 80 is stored in any of the control zones A to D other than the control zone E after being moved forward, only by being loaded in the control zone A, the pallet 80 is automatically transferred as described above.

The above-mentioned embodiment writes a command to "transfer" in the programs in the controllers 101 to 105, but the present invention is not limited thereto. For example, the motor 21 may be commanded by a value (transfer distance), a rotation angle of the motor 21, or a pulse number.

Now, the "first-in first-out" operation by the conveyor 3 in this embodiment will be described in detail below with reference to FIGS. 7A to 7F.

Figure 7A:
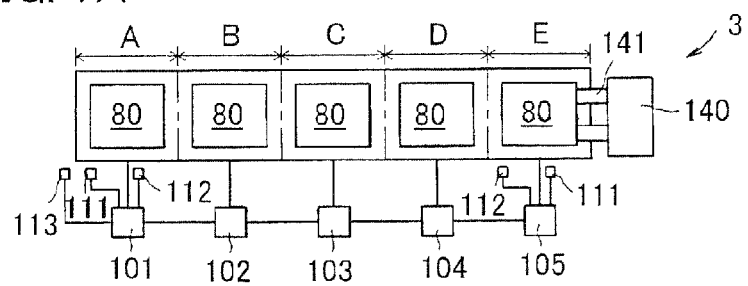
FIGS. 7A to 7F are explanatory diagrams illustrating states of the conveyor, the device performing a first-in first-out operation, in which pallets in the control zones A to D are sequentially transferred forwardly after a pallet has been unloaded from the unloading zone.

In FIG. 7A, pallets 80 are stored in all the control zones A to E, respectively. In the control zone E ("unloading zone"), one pallet 80 is being unloaded by the forklift 140. The forklift 140 approaches the control zone E, which is detected with the proximity switch 111. Upon reception of the detection signal, the controller 105 transmits a stop signal to the upstream controller 104 adjacent to the loading side based on the stored program.

Upon reception of the stop signal, the controller 104 stops a transferring operation in the control zone D. At this time, since the control zone D has a pallet 80, "load presence information" of the control zone D remains to indicate "existence" and is transmitted to the upstream controller 103 adjacent to the loading side. The "load presence information" indicates "existence" in the downstream controller 104 adjacent to the unloading side, so that the controller 103 is unable to transfer a pallet 80 in the home control zone C. The same can be said to the subsequent control zones B and A. Shortly, the stop signal transmitted from the controller 105 brings the pallets 80 in the control zones A to D to stop to be transferred.

Hence, when any of "load presence information" of the control zones A to D indicates "empty", a pallet 80 newly transferred from the "loading zone" can be transferred to the control zone having "load presence information" indicating "empty". In other words, even during unloading of the pallet 80 from the "unloading zone", other pallets 80 can be moved forward to the control zone having the "load presence information" indicating "empty". That enables simultaneous operations of loading and unloading.

Figure 7B:
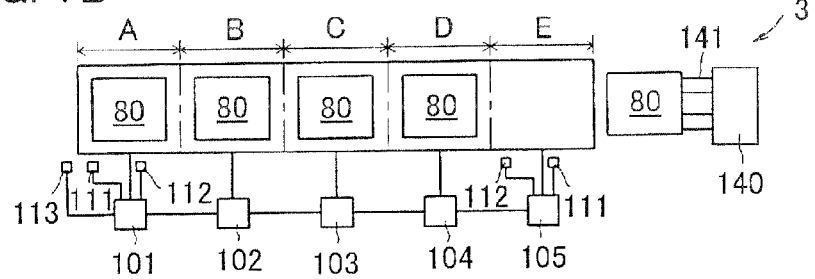

FIG. 7B illustrates a state after the pallet 80 has been unloaded from the control zone E by the forklift 140. The proximity switch 111 detects separation of the forklift 140 from the control zone E, while the infrared sensor 112 detects nonexistence of the pallet 80 in the control zone E. Upon reception of those detection signals, the controller 105 stops transmitting the stop signal to the controller 104, thereby breaking the interlock circuit. The controller 105 further transmits "load presence information" indicating "empty" to the controller 104.

Figure 7C:
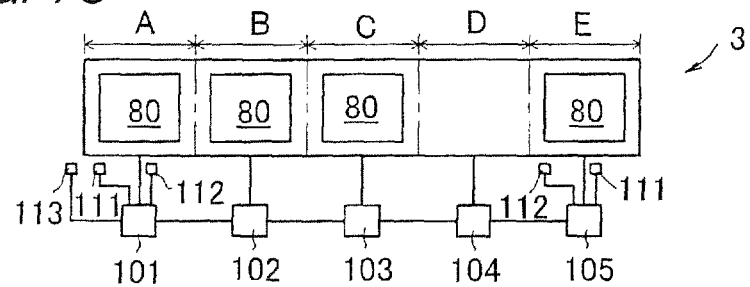
Figure 7D:
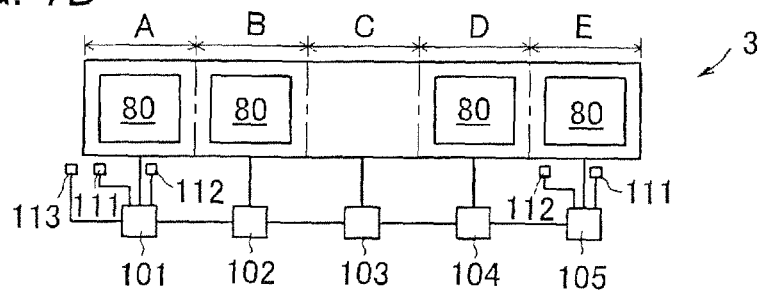
Figure 7E:
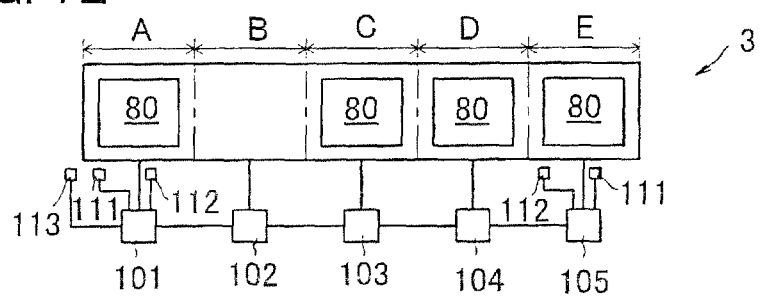

Having received the "load presence information" indicating "empty" from the controller 105, the controller 104 transfers the pallet 80 from the control zone D to the downstream control zone E adjacent to the unloading side based on the "first-in first-out" program. As a result, the conveyor 3 becomes as can be seen in FIG. 7C.

In FIGS. 7C to 7F, the controllers 103, 102, and 101 performs in this order the same operations as the controller 104 do. As a result, the pallets 80 stored in the respective control zones C, B, and A are sequentially transferred to the unloading side (downstream) one by one based on the "first-in first-out" program.

As above, when one pallet 80 has been unloaded from the control zone E, the controllers 104, 103, 102, and 101 sequentially transfer pallets 80 stored in the control zones D, C, B, and A to the unloading side (downstream) one by one based on the stored "first-in first-out" program. In other words, a first-in pallet 80 is firstly out from the conveyor 3.

Figure 7F:
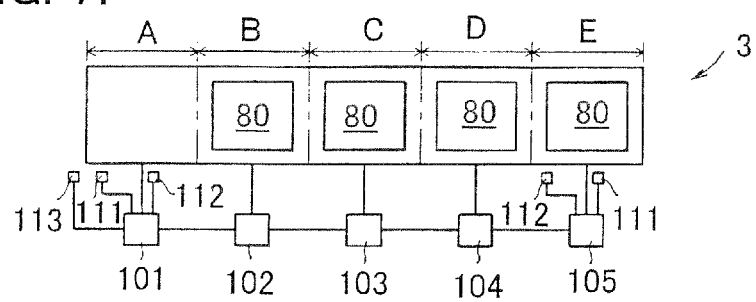

Hence, in a state in FIG. 7F, pushing of the motor-reverse switch 113 disposed in the control zone A (loading zone) allows the pallet 80 stored in the control zone B to be transferred to the loading side. That enables a "last-in first-out" program to unload a pallet 80 in reverse order from the loading order. That allows, for example, a pallet 80 having been mistakenly loaded to be unloaded from the loading zone.

The above-mentioned embodiment illustrates an example in which pallets 80 stored in the control zones D, C, B, and A are sequentially transferred to the unloading side one by one, but the present invention is not limited thereto. For example, when one pallet 80 has been unloaded from the control zone E, the controller 105 may transmit the "load presence information" indicating "empty" to all the other controllers 101 to 104, so that the pallets 80 stored in the control zones D, C, B, and A are simultaneously transferred to the unloading side (downstream).

This embodiment employs a simple conveyor for use in the control zone E, but the present invention is not limited thereto. The control zone E, for example, may be equipped with a fail-safe device such as a mechanical stopper. Alternatively, the control zone E may be equipped with a stopper so as to function as an end point of the operation to move forward (upstream) by bringing in contact of a pallet 80 with the stopper.

This embodiment illustrates the configuration in which one controller controls one control zone. Specifically, the above-mentioned embodiment has the same number of the control zones as that of the controllers, or one control zone having one controller. However, the present invention is not limited thereto and may have, for example, a controller controlling more than one control zone and may be configured only by controllers each controlling more than one control zone.

Figure 8:
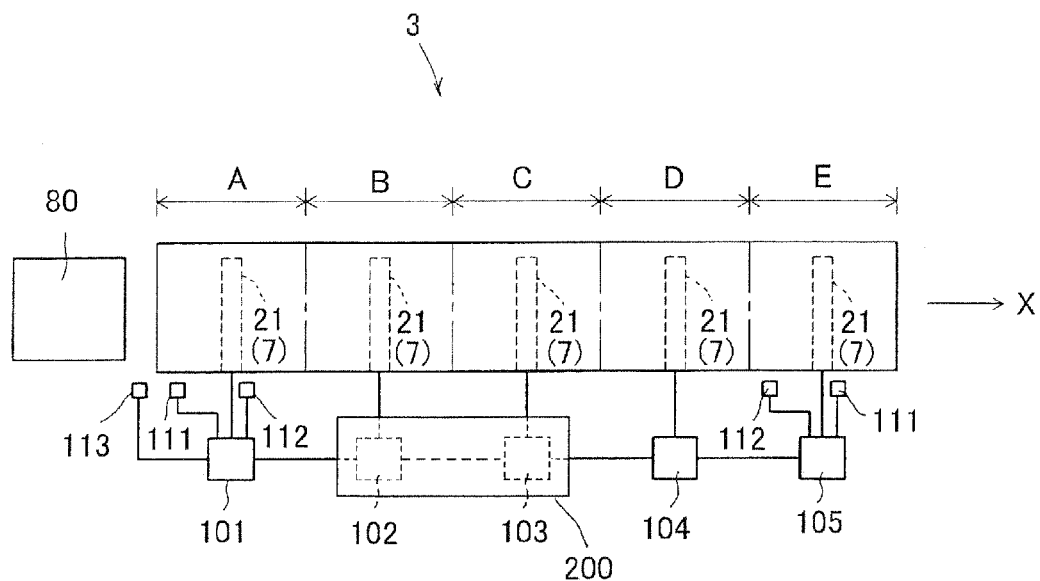
FIG. 8 is an explanatory diagram of another embodiment of the conveyor.

In an embodiment shown in FIG. 8, the conveyor 3 includes a controller 200 provided with a function of the controller 102 controlling the control zone B and a function of the controller 103 controlling the control zone C. Being a simple device, the controller 200 contains both information of the control zone B and the control zone C and requires no communication function described above between the controller 102 and the controller 103.

However, the controller 200 is provided with a communication circuit 123 for communicating with other controllers. The communication circuit 123 is connected to the downstream controller 104 adjacent to the unloading side and the upstream controller 101 adjacent to the loading side.

The controller 200 receives "load presence information" indicating whether a pallet 80 exists in the control zone D from the downstream controller 104 adjacent to the unloading side and transmits "load presence information" indicating whether a pallet 80 exists in the home control zone B to the upstream controller 101 adjacent to the loading side.

Figure 9:
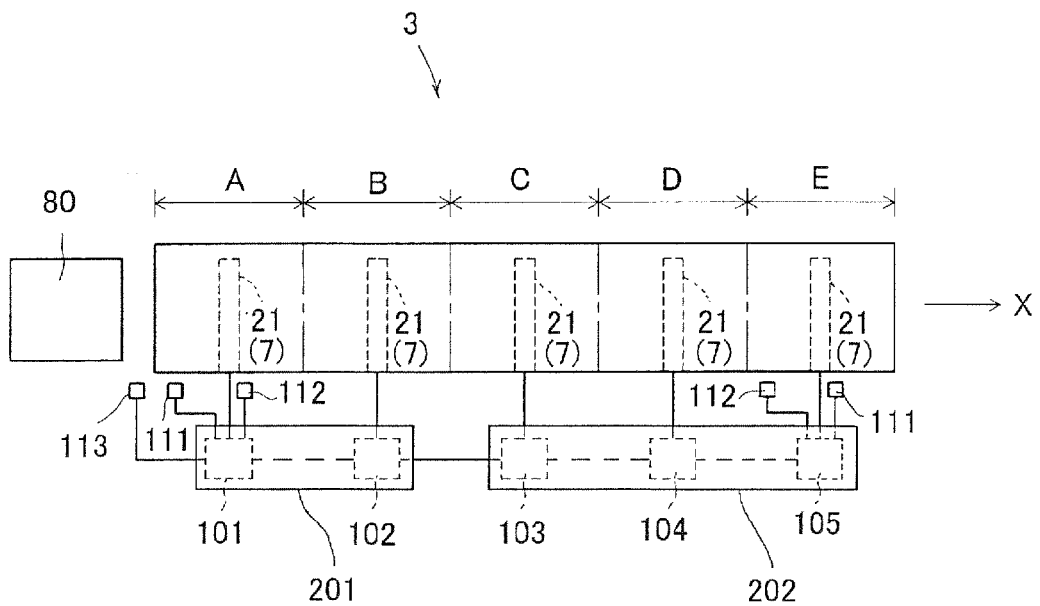
FIG. 9 is an explanatory diagram of still another embodiment of the conveyor.

Alternatively, as shown in FIG. 9, the conveyor 3 may have a mix of controllers 201 and 202 each controlling a plurality of control zones including an end control zone. In this embodiment, the controller 201 controls the control zones A and B and the controller 202 controls the control zones C, D, and E.

Secondly, a configuration including a mechanical configuration in the conveyor 3 employed in the embodiment in this invention will be described in detail below.

Figure 10:
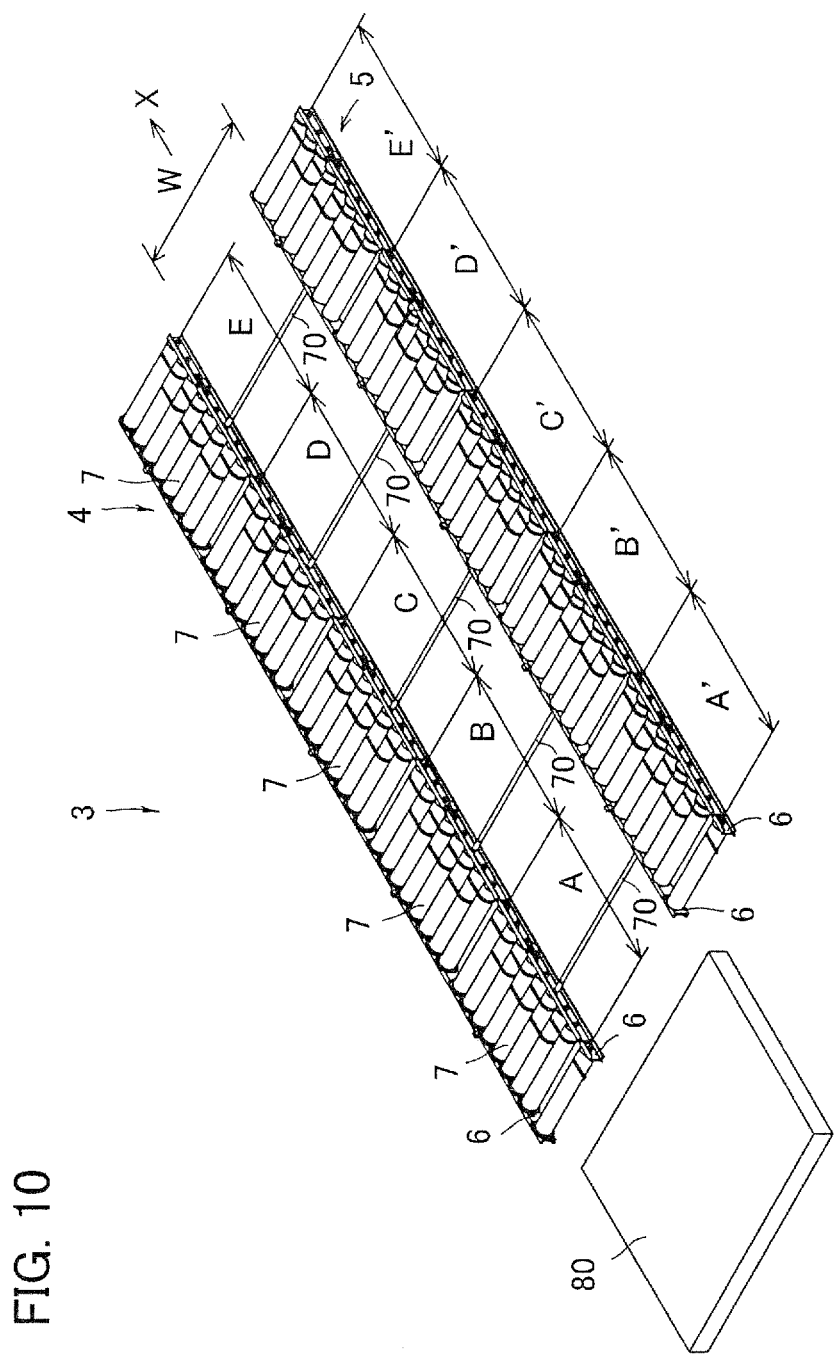
FIG. 10 is a perspective view of the conveyor used in the storage device.

The conveyor 3 (3A and 3B) is, as shown in FIG. 10, configured by two roller conveyors 4 and 5 arranged in parallel with a space W.

The roller conveyor 4 has a motorized roller (roller incorporating a motor) 7, being a self-propelled driving conveyor with a driving source, while the roller conveyor 5 is a driven conveyor without a driving source. Hereinafter, the roller conveyor 4 is referred to as the driving conveyor 4 and the roller conveyor 5 is referred to as the driven conveyor 5.

Figure 11:
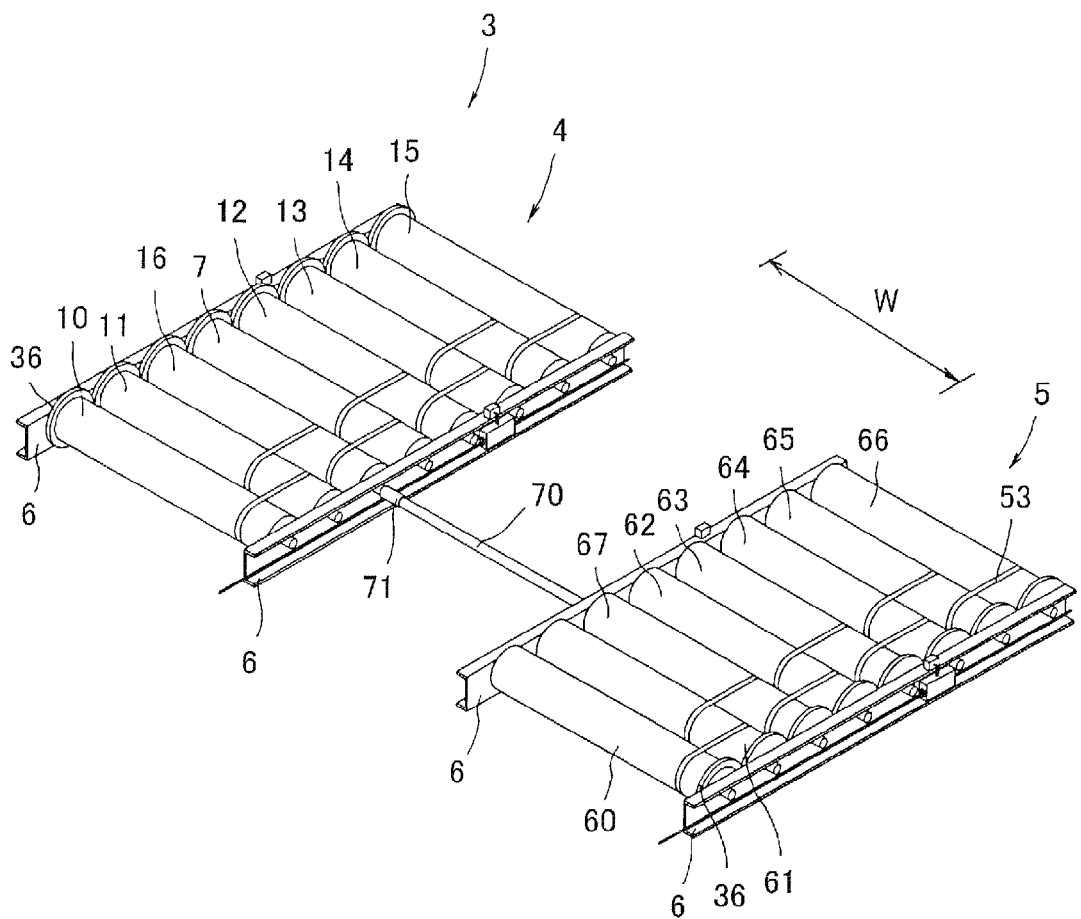
FIG. 11 is a perspective view of one zone in the conveyor in FIG. 10.

The driving conveyor 4 is, as well as the known one, configured by frames 6 disposed in parallel and a plurality of rollers supported by the frames 6 and aligned parallel to one another. The driving conveyor 4 is divided into a plurality of zones A to E in the traveling direction (in the direction of an arrow X), each zone having eight rollers including one motorized roller 7 as shown in FIG. 11.

Specifically, the rollers in each of the zones of the driving conveyor 4 consist of only one motorized roller 7 and seven idle rollers 10 to 16.

Figure 14:
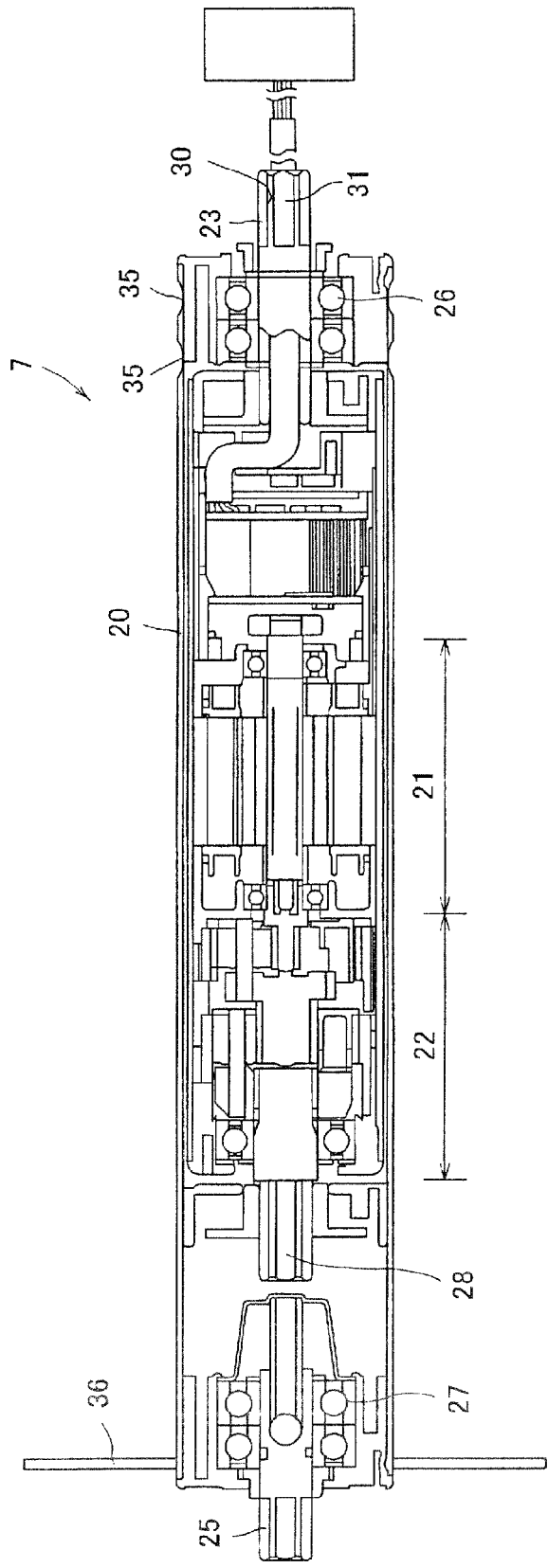
FIG. 14 is a cross section of a roller incorporating a motor employed the conveyor in FIG. 10.

The motorized roller 7 has a configuration, for example, as shown in FIG. 14, in which a roller body 20 incorporates the motor 21 and a reducer 22. The reducer 22 has an output shaft 28 engaged with an inner surface of the roller body 20, so that a rotational force of the motor 21 is reduced by the reducer 22 and rotates the roller body 20.

The roller body 20 has support shafts 23 and 25 projecting from its both ends respectively. The support shafts 23 and 25 are mounted to the roller body 20 via bearings 26 and 27 respectively. The roller body 20 is rotatable relative to the support shafts 23 and 25. The support shaft 23 is hollow with a hollow part 30, in which a feeder cable 31 is inserted so as to receive power feeding through the cable 31 from outside.

The roller body 20 has two annular grooves 35 for fitting belts 53 on its surface.

The roller body 20 is further provided with a circular flange 36 attached to one end thereof.

Figure 15:
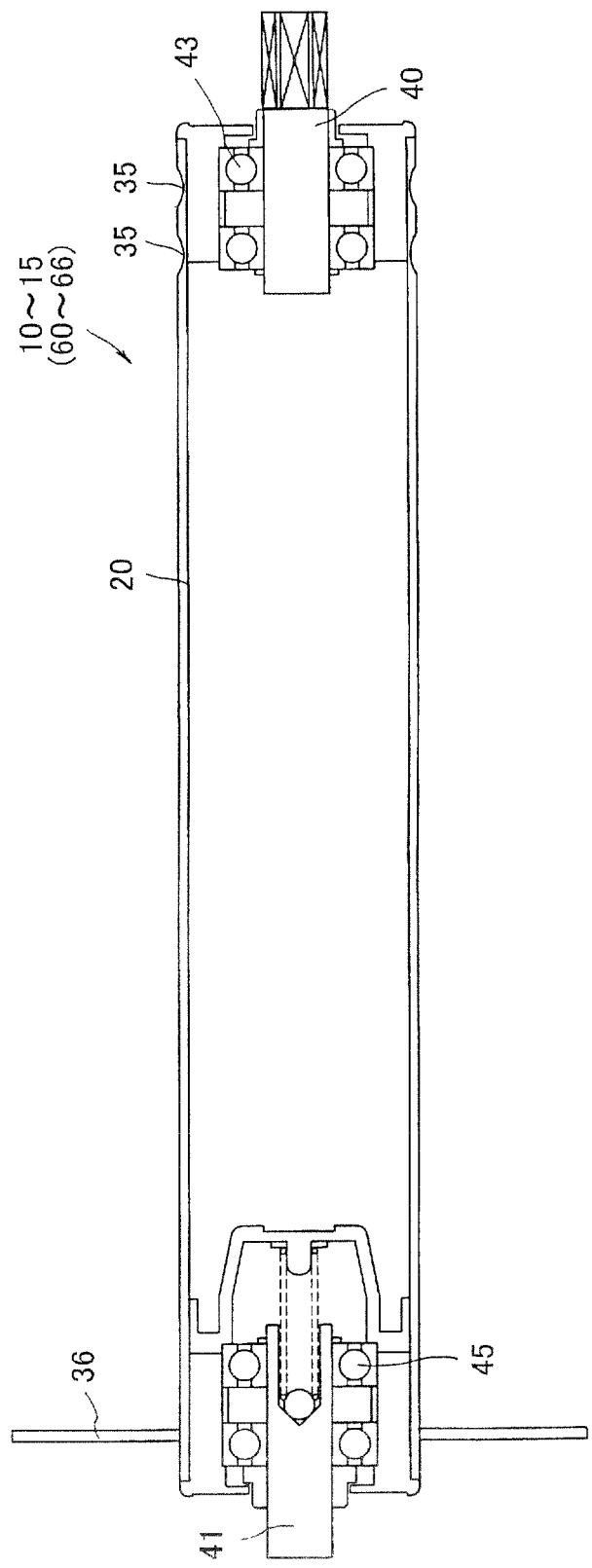
FIG. 15 is a cross section of an idle roller of a roller-body rotary type employed in the conveyor in FIG. 10.

Six idle rollers 10 to 15 of the idle rollers 10 to 16 each are of a roller-body rotary-type having a configuration shown in FIG. 15.

The idle rollers 10 to 15 each have no drive source such as a motor within the roller body 20.

Specifically, the idle rollers 10 to 15 each has a roller body 20 with support shafts 40 and 41 projecting from its both ends respectively. The support shafts 40 and 41 are mounted to the roller body 20 via bearings 43 and 45 respectively.

The roller body 20 is rotatable relative to the support shafts 40 and 41. In each of the idle rollers 10 to 15, the roller body 20 is rotatable relative to the support shafts 40 and 41.

The roller body 20 has the same configuration as that of the motorized roller 7 and has two annular grooves 35 for fitting belts 53 on its surface.

The roller body 20 is further provided with a circular flange 36 attached to one end thereof.

Figure 16:
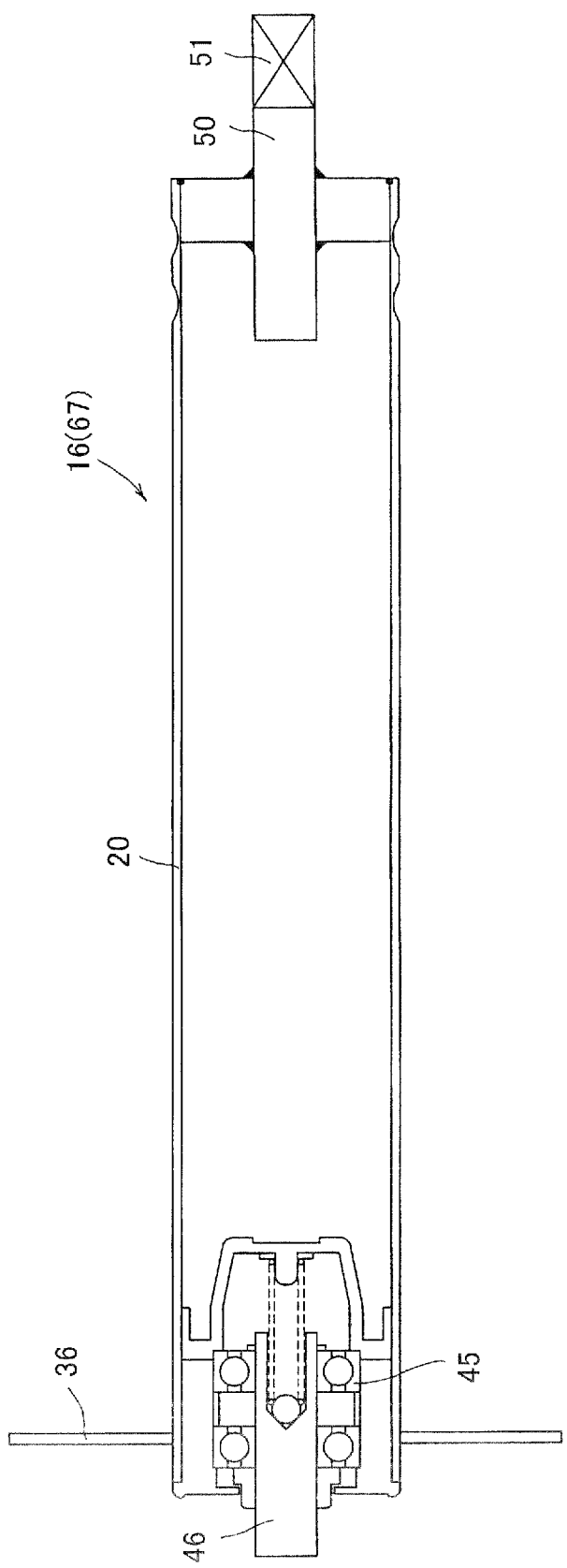
FIG. 16 is a cross section of an idle roller of an integrated roller-body and support-shaft type employed in the conveyor in FIG. 10.

The idle roller 16 of the idle rollers 10 to 16 is of an integrated roller-body and support-shaft type as shown in FIG. 16 and has support shafts 46 and 50 projecting from its both ends respectively.

The idle roller 16 of an integrated roller-body and support-shaft type is different from the idle rollers of a roller-body rotary-type 10 to 15 in that the roller body 20 of the idle roller 16 is rotatable relative to one support shaft 46, though the roller body 20 of each of the idle rollers 10 to 15 is rotatable relative to the both support shafts 40 and 41. Specifically, in the idle roller 16, the other support shaft 50 is integrated with the roller body 20 so that the roller body 20 is not allowed to rotate relative to the support shaft 50.

The support shaft 50 has a distal end 51 with a polygonal cross section. More specifically, the distal end 51 of the support shaft 50 is of a square shape engageable with other members.

The driving conveyor 4 is, as described above, configured by the parallel frames 6 and the rollers supported by the frames 6 and aligned parallel to one another. Specifically, in each zone, the motorized roller 7 and the idle rollers 10 to 15 are arranged between the frames 6 so as to prevent rotation of the support shafts 23, 25, 40, and 41. Being rotatable relative to the support shafts 23, 25, 40, and 41, the roller bodies 20 are rotatable relative to the frames 6.

Figure 12:
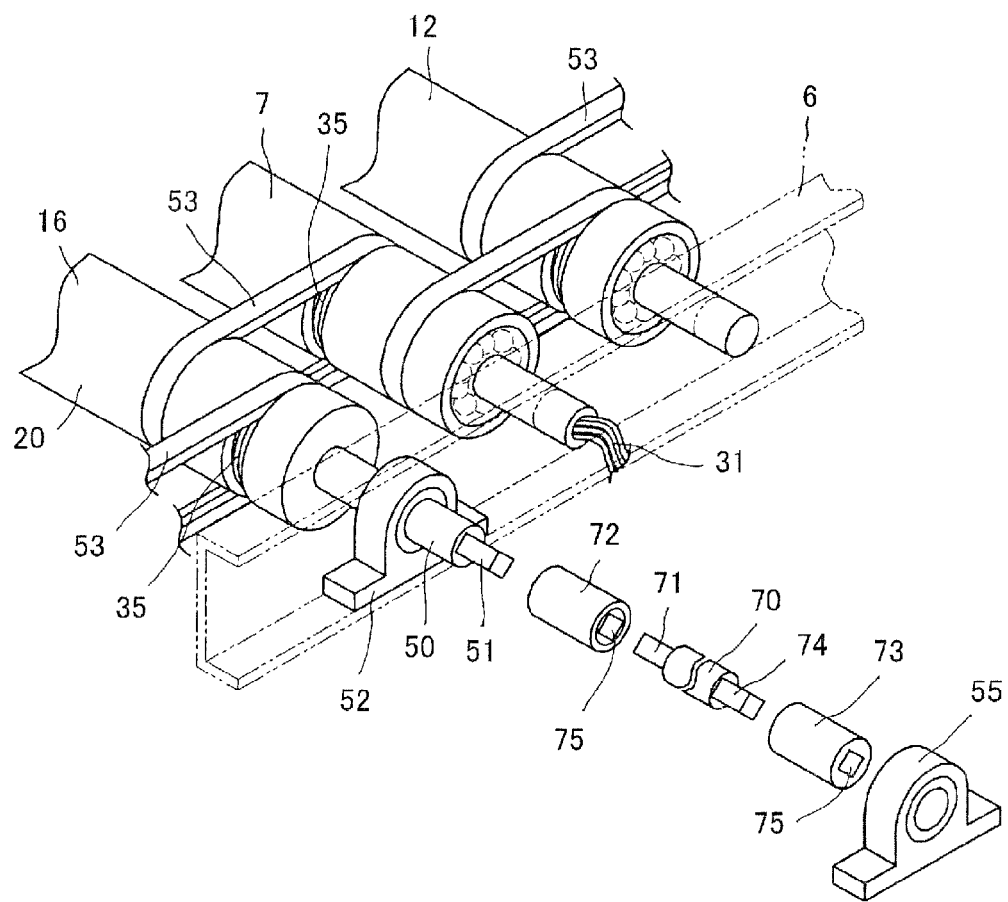
FIG. 12 is an exploded perspective view of an essential part near a driving conveyor in the conveyor in FIG. 10.

In contrast, the idle roller 16 is, as shown in FIG. 12, mounted to the frames 6 by the support shaft 50 integrated with the roller body 20 via a bearing 52 and by the support shaft 46 attached unrotatably relative to the frame 6.

Therefore, in the idle roller 16, the roller body 20 is rotatable relative to the frames 6 while the support shaft 50 rotates integrally with the roller body 20.

In the rollers 7 and 10 to 16, the belts 53 are spanned between adjacent rollers respectively. Specifically, the rollers 7 and 10 to 16 each have the two grooves 35 on its surface, so that one belt 53 is spanned around one groove 35 of one roller and another groove 35 of its adjacent roller. Thus, all the rollers 7 and 10 to 16 work together so that rotation of any one of the rollers 7 and 10 to 16 rotates any others of the rollers 7 and 10 to 16.

Now, the driven conveyor 5 will be described in detail below.

The driven conveyor 5 is also configured by frames 6 disposed in parallel and a plurality of rollers supported by the frames 6 and aligned in parallel to one another. The driven conveyor 5 is also divided into a plurality of zones A' to E', each zone having eight rollers 60 to 67 as shown in FIG. 11. The rollers 60 to 67 in the driven conveyor 5 are all idle rollers without a motorized roller.

Seven idle rollers 60 to 66 of the idle rollers 60 to 67 each are of a roller-body rotary-type with a configuration shown in FIG. 15.

Each of the idle rollers 60 to 66 has the same configuration as that of the idle rollers 10 to 15, having no drive source such as a motor in the roller body 20. The roller body 20 has support shafts 40 and 41 projecting from its both ends respectively, being rotatable relative to the support shafts 40 and 41.

The roller body 20 also has two annular grooves 35 for fitting belts 53 on its surface and a circular flange 36 at one end thereof.

The idle roller 67 of the idle rollers 60 to 67 is of an integrated roller-body and support-shaft type as shown in FIG. 16.

The idle roller 67 has the same configuration as that of the above-mentioned idle roller 16, so that the roller body 20 is rotatable relative to only one support shaft 46. Shortly, in the idle roller 67, the support shaft 50 and the roller body 20 are integrally attached to each other so as to be unrotatable relative to each other.

The roller body 20 of the idle roller 67 also has two annular grooves 35 for fitting belts 53 on its surface and a circular flange 36 attached to one end thereof.

As described above, the driven conveyor 5 is also configured by the frames 6 disposed in parallel and a plurality of the rollers supported by the frames 6 and aligned in parallel to one another. Hence, the driven conveyor 5 has no motorized roller, using the idle roller of a roller-body rotary type instead of the motorized roller 7. Additionally, the driven conveyor 5 and the driving conveyor 4 are symmetrically arranged so that the flange 36 and the support shaft 50 in the driven conveyor 5 are designed in a mirror-image fashion with respect to those in the conveyor 4.

The driven conveyor 5, as well as the driving conveyor 4, has one roller body 67 of an integrated roller-body and support-shaft type, which is arranged at the same position as the idle roller 16 of an integrated roller-body and support-shaft type in the driving conveyor 4.

Also in the driven conveyor 5, the idle rollers 60 to 66 of a roller-body rotary type are supported by the frames 6 at both ends via the support shafts 40 and 41 unrotatably attached.

Figure 13:
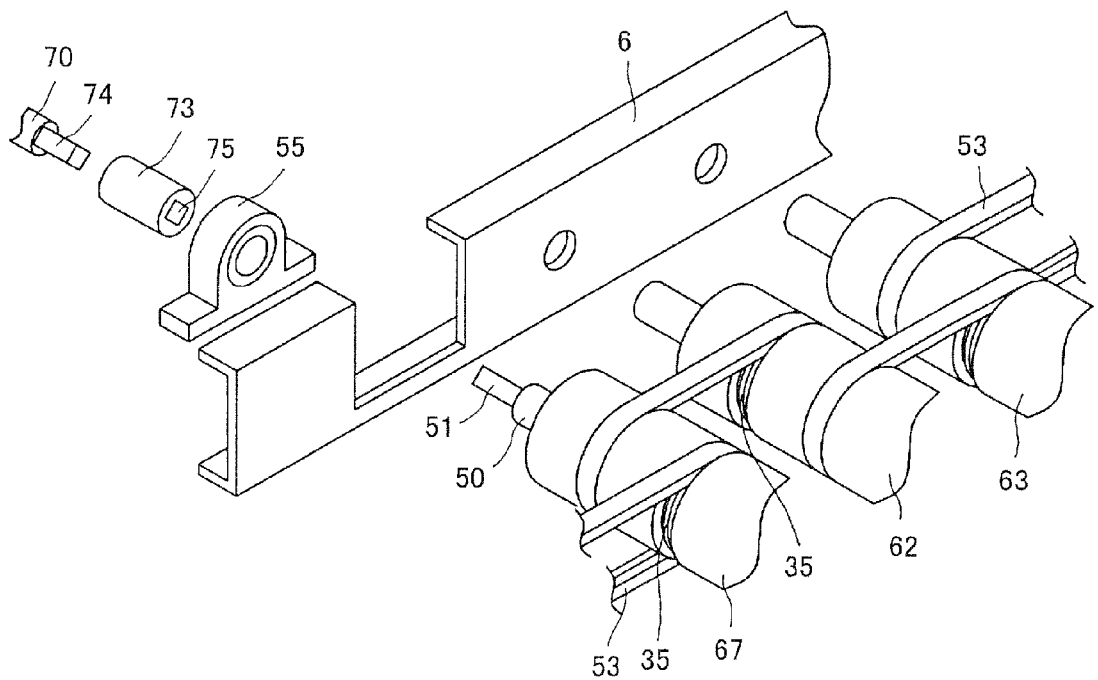
FIG. 13 is an exploded perspective view of an essential part near a driven conveyor in the conveyor in FIG. 10.

On the other hand, as shown in FIG. 13, the idle roller 67 is supported by the frames 6 so that the support shaft 50, which is integrated with the roller body 20, is supported by the frame 6 via a bearing 55 and the support shaft 46 is unrotatably attached to the frame 6.

Therefore, the roller body 20 of the idle roller 67 is rotatable relative to the frames 6, but with the support shaft 50 designed to rotate integrally with the roller body 20.

In the rollers 60 to 67, the belts 53 are spanned between the respective adjacent rollers 60 to 67, thereby allowing all the rollers 60 to 67 to work together. As a result, rotation of any of the rollers 60 to 67 rotates the others of the rollers 60 to 67.

As described above, the driving conveyor 4 and the driven conveyor 5 are arranged in parallel with the space W and symmetrically with respect to each other.

Consequently, the flanges 36 of the rollers are situated at outer sides of the conveyor 3 and the support shafts 50 designed to rotate integrally with the roller bodies 20 of the idle rollers 16 and 67 project toward the center between the driving conveyor 4 and the driven conveyor 5.

Each of the zones A to E and A' to E' includes one idle roller 16 or 67 of an integrated roller-body and support-shaft type, with the idle roller 16 and the idle roller 67 being arranged at the same position.

Therefore, the support shaft 50 of the idle roller 16 of the driving conveyor 4 and the support shaft 50 of the idle roller 67 of the driven conveyor 5 are positioned opposite each other.

Additionally, the support shaft 50 of the driving conveyor 4 and the support shaft 50 of the driven conveyor 5 are connected to each other via a shaft 70 so as to integrally rotate.

The shaft 70 is a round bar with both ends 71 and 74 each formed in a square shape. The both ends 71 and 74 of the shaft 70 are connected to the support shafts 50 via shaft couplings 72 and 73 respectively.

The shaft couplings 72 and 73 each are a hollow cylinder with a square through-hole 75 in its center. In each of the shaft couplings 72 and 73, the support shaft 50 is inserted in one end of the through-hole 75 and the shaft 70 is inserted in the other end thereof.

Since the cross-sectional shapes of the support shafts 50, the through-holes 75 of the shaft couplings 72 and 73, and the both ends 71 and 74 of the shaft 70 are of a square shape, thereby preventing a relative rotation and allowing an integral rotation. Shortly, a rotational force of one of the support shafts 50 is transmitted to the other of the support shafts 50.

Thirdly, an operation of the conveyor 3 will be described in detail below.

The conveyor 3 is designed to convey large and square pallets 80. In conveyance of the pallets 80, the motorized roller 7 of the driving conveyor 4 is rotated. The motorized roller 7 is, as described above, linked with all the idle rollers 10 to 16 in the same zone directly by the belts 53 and indirectly via the directly-linked idle rollers by the belts 53. Thus, rotation of the motorized roller 7 starts rotation of all the idle rollers 10 to 16 in the same zone.

Along with the rotation of the roller body 20 of the idle roller 16 of an integrated roller-body and support-shaft type as a consequence, the support shaft 50 of the idle roller 16 rotates. Then, the shaft 70 connected to the support shaft 50 via the shaft coupling 72 rotates, thereby rotating the support shaft 50 in the driven conveyor 5 via the shaft coupling 73 connected to the other end of the shaft 70.

That rotates the idle roller 67 of an integrated roller-body and support-shaft type in the driven conveyor 5. Then, since the roller body 20 of the idle roller 67 is linked with the idle rollers 60 to 66 via the belts 53, the rotation of the roller body 20 of the idle roller 67 rotates the idle rollers 60 to 66 in the same zone.

The rotation of all the rollers 10 to 16, 60 to 67 synchronizes with the rotation of the motorized roller 7 in the driving conveyor 4, and whereby all the rollers 7, 10 to 16, 60 to 67 synchronously rotate. As a consequence, the pallets 80 are straightly transferred.

Figure 17:
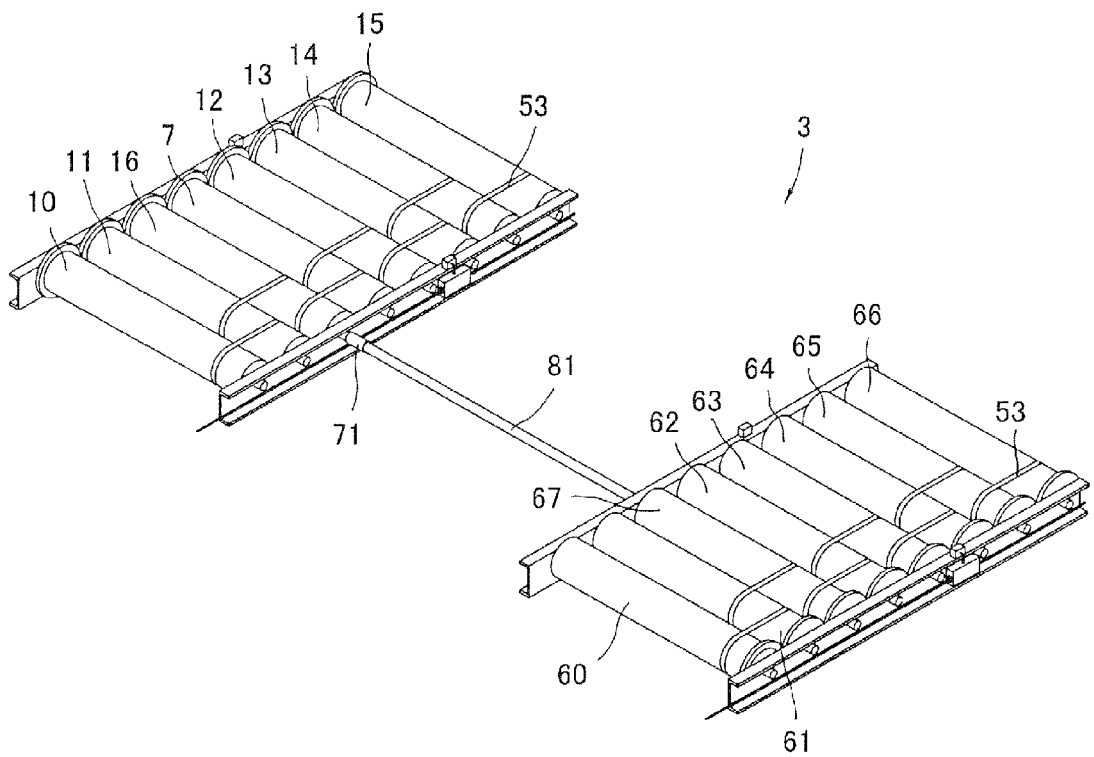
FIG. 17 is a perspective view of the conveyor with an increased full width.
Figure 18:
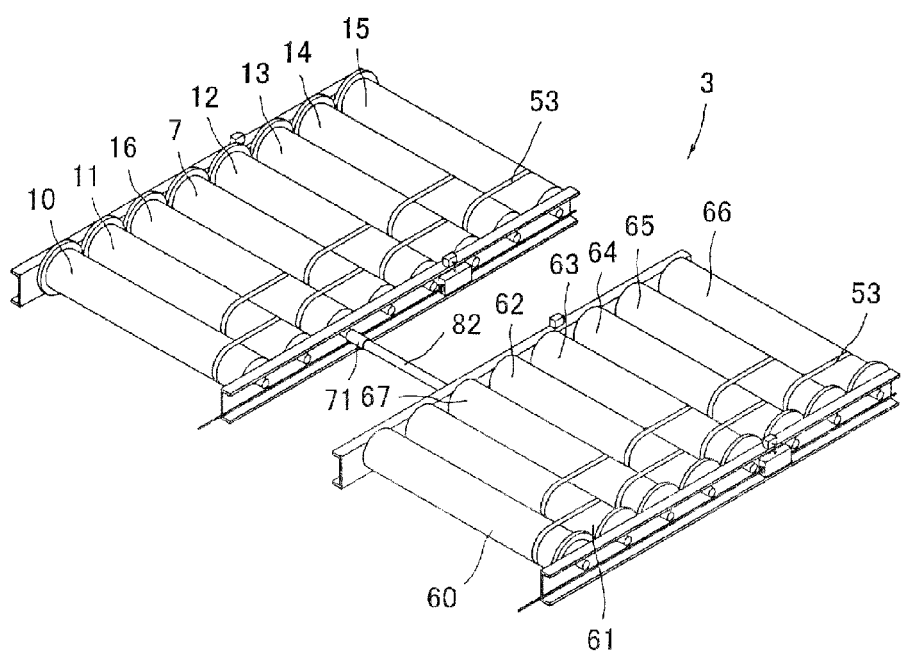
FIG. 18 is a perspective view of the conveyor with a reduced full width.

It is possible to easily modify a width of the conveyor 3 depending on a size of an article to be conveyed (pallet 80). Specifically, in a case of a large article (pallet 80), the space W between the driving conveyor 4 and the driven conveyor 5 are widened and the conveyors 4 and 5 are connected via a longer shaft 81 as shown in FIG. 17. In contrast, in a case of a small article (pallet 80), the space W is reduced and the conveyors 4 and 5 are connected by a shorter shaft 82 as shown in FIG. 18.

The above-mentioned embodiment employs the shaft coupling having a simple configuration in which a square hole is formed in a cylinder, but the present invention is not limited thereto and may employ one having a discretionary shape of the hole including, for example, a hexagonal shape, a triangle shape, or a "D" shape. Further, the shaft coupling may have a discretionary configuration and employ any of the conventional one including, for example, a universal shaft coupling or an elastic shaft coupling.

Figure 19:
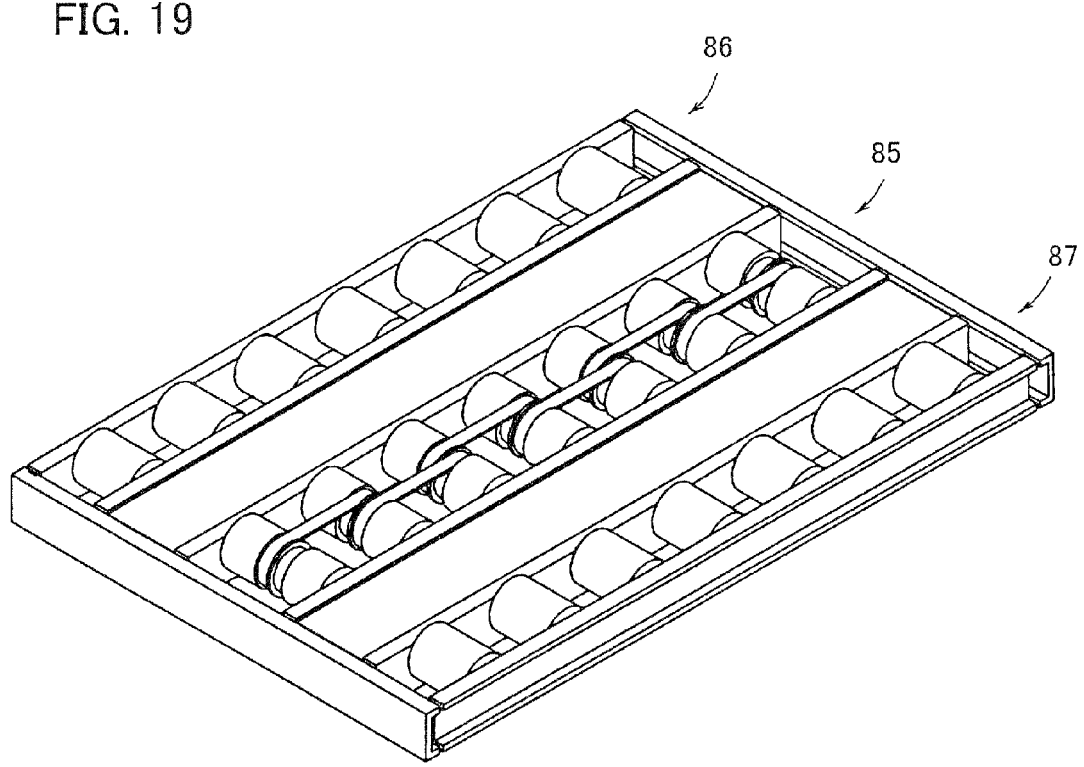
FIG. 19 is a perspective view of yet another embodiment of the conveyor.

The present embodiment arranges the two conveyors in parallel, but the present invention is not limited thereto and may arrange more than two conveyors. As shown in FIG. 19, for example, three conveyors may be arranged in parallel, a center conveyor 85 being functioning as a driving conveyor and conveyors 86 and 87 at both sides being functioning as driven conveyors.

The above-mentioned embodiment transmits a rotational force to all the rollers by combining adjacent rollers by the belts, but the present invention is not limited thereto and may use one chain spanned around a plurality of the rollers to synchronously rotate all the rollers. The present invention can be applied to not only a roller conveyor but also a belt conveyor.

In the above-mentioned embodiment, the idle rollers 16 and 67 are connected via the shaft 70. This is because the members such as the feeder cable 31 are exposed outside of the end portion of the motorized roller 7 functioning as a driving roller, rendering difficult to take off a power from the support shaft 23. But, the present invention will not deny the power takeoff from the motorized roller 7.

The invention claimed is:

1. An article storage device for storing a plurality of articles and having a plurality of storage compartments aligned in series, comprising a conveyor for conveying articles, the conveyor having an article loading side, from which an article is transferred, and an article unloading side, to which an article is transferred, wherein the conveyor is designed to run at least in a direction from the loading side to the unloading side and arranged over all the storage compartments, wherein the conveyor is divided into a plurality of control zones corresponding to the respective storage compartments, the control zones consisting of a first end control zone adjacent to the loading side, a second end control zone adjacent to the unloading side, and at least one intermediate control zone between the first and the second end control zones, wherein the conveyor is provided with a controller in each of the control zones, at least the controller provided in the intermediate control zone having an arrival detector, a load-presence memorizing means, and a communication tool, the arrival detector being for detecting an article being entering a home control zone from the control zone adjacent to the loading side, the load-presence memorizing means being for memorizing information indicating whether an article exists or not in the home and/or the other control zones, the communication tool being for transmitting load presence information indicating whether an article exists or not in the home control zone to the controller in the control zone adjacent to the loading side, wherein the conveyor further comprises load presence detectors provided in at least the first and the second end control zones, so that articles are moved up to the unloading side and stored in the device, and wherein the conveyor comprises a motor and a rotary body working with the motor, the motor and the rotary body being arranged in each of the control zones, the arrival detector being designed to detect an article entering the home control zone from the control zone adjacent to the loading side with an induced rotation of the rotary body in the home control zone by an article entering the home control zone as one condition.

2. The article storage device as defined in claim 1, wherein the conveyor comprises a motor and a rotary body working with the motor, the motor and the rotary body being arranged in each of the control zones, the device further comprising a carrier detector for detecting approach and/or separation of an external self-propelled carrier in each of the first and second end control zones, being designed to automatically move up articles stored in the control zones to the respective control zones adjacent to the unloading side upon unloading of an article in the second end control zone, and further comprising a motor-reverse switch, the motor-reverse switch being designed to transmit a signal to the controllers, the signal being a command to transfer articles stored in the control zones to the control zones adjacent to the loading side, and the controller in the intermediate control zone driving the conveyor in power activation and/or power fail recovery to press, if any, an article stored in each control zone against another article in a control zone adjacent to the unloading side so as to determine whether the article exists in the home control zone.

3. The article storage device as defined in claim 1, further comprising a Hall IC for detecting a rotation of the motor induced by an article entering the home control zone and generating a pulse voltage, and being designed to detect the induced rotation of the rotary body by the pulse voltage.

4. The article storage device as defined in claim 1, being designed to detect the induced rotation of the rotary body induced by an article entering the home control zone by a back electromotive force generated when the motor receives a rotational force.

5. The article storage device as defined in claim 1, further comprising a carrier detector for detecting approach and/or separation of an external self-propelled carrier in each of the first and second end control zones.

6. The article storage device as defined in claim 5, wherein the conveyor has the motor in each of the control zones, and being designed to make the motor in the first end control zone inoperable upon detection of approach of a part of the carrier to the first end control zone.

7. The article storage device as defined in claim 6, being designed to make the motor in the first end control zone operable upon detection of separation of the part of the carrier from the first end control zone.

8. The article storage device as defined in claim 5, being designed to transmit a stop signal to the controller in the control zone adjacent to the loading side upon detection of approach of the part of the carrier to the second end control zone.

9. The article storage device as defined in claim 8, being designed to transmit information of no article existing in the second end zone to the controller in the control zone adjacent to the loading side upon detection of separation of the part of the carrier from the second end control zone and detection of no article existing in the second end control zone.

10. The article storage device as defined in claim 1, being designed to automatically move up articles stored in the control zones to the respective control zones adjacent to the unloading side upon unloading of an article in the second end control zone.

11. The article storage device as defined in claim 1, being designed to transmit the load presence information of the home control zone to the control zone adjacent to the loading side upon confirmation of arrival of an article in the home control zone of the intermediate control zone.

12. The article storage device as defined in claim 1, further comprising a motor-reverse switch, the motor-reverse switch being designed to transmit a signal to the controllers, the signal being a command to transfer articles stored in the control zones to the control zones adjacent to the loading side.

13. The article storage device as defined in claim 1, the controller in the intermediate control zone driving the conveyor in power activation and/or power fail recovery to press, if any, an article stored in each control zone against another article in a control zone adjacent to the unloading side so as to determine whether the article exists in the home control zone.

14. The article storage device as defined in claim 13, wherein the conveyor comprises the motor arranged in each of the control zones, being designed to detect whether the article is pressed or not against the other article by a current due to overload of the motor.

15. The article storage device as defined in claim 14, being designed to perform a reverse rotation of the motor if and when the article in the home control zone has been pressed against the other article so as to leave a space between the articles.

16. The article storage device as defined in claim 1, wherein the conveyor comprises the motor arranged in each of the control zones, the controller in the intermediate control zone driving the conveyor in power activation and/or power fail recovery to determine whether an article exists in the home control zone by a current in an inching or a low-speed rotation of the motor.

17. The article storage device as defined in claim 1, wherein the conveyor comprises the motor arranged in each of the control zones, the controller stopping the motor in the second end control zone upon detection of arrival of an article in the second end control zone.

18. The article storage device as defined in claim 1, further comprising a stopper in the second end control zone.

19. The article storage device according to claim 1 wherein there is no load presence detector in the one intermediate control zone.

20. An article storage device for storing a plurality of articles and having a plurality of storage compartments aligned in series, comprising a conveyor for conveying articles, the conveyor having an article loading side, from which an article is transferred, and an article unloading side, to which an article is transferred, wherein the conveyor is designed to run at least in a direction from the loading side to the unloading side and arranged over all the storage compartments, wherein the conveyor is divided into a plurality of control zones corresponding to the respective storage compartments, the control zones consisting of a first end control zone adjacent to the loading side, a second end control zone adjacent to the unloading side, and at least one intermediate control zone between the first and the second end control zones, wherein the conveyor is controlled by at least two controllers, the device further comprising motors each operating the respective control zones, the controllers each controlling one or more control zones in charge and being designed to discretely activate and stop the motors in the control zones in charge, at least the controller for controlling the intermediate control zone having an arrival detector, a load-presence memorizing means, and a communication tool, the arrival detector being for detecting an article being entering any of the control zones in charge from the control zone adjacent to the loading side, the load-presence memorizing means being for memorizing information indicating whether an article exists or not in any of the control zones in charge, the communication tool being for transmitting load presence information indicating whether an article exists or not in the control zone mostly adjacent to the loading side of the control zones in charge to the controller in the control zones adjacent to the loading side and/or for receiving load presence information indicating whether an article exists or not in the control zones further adjacent to the unloading side than the control zones in charge, wherein the conveyor further comprises load presence detectors provided in at least the first and the second end control zones, so that articles are moved up to the unloading side and stored in the device, and wherein the conveyor comprises a motor and a rotary body working with the motor, the motor and the rotary body being arranged in each of the control zones, the arrival detector being designed to detect an article entering the home control zone from the control zone adjacent to the loading side with an induced rotation of the rotary body in the home control zone by an article entering the home control zone as one condition.

21. The article storage device according to claim 20 wherein there is no load presence detector in the one intermediate control zone.

22. A conveyor having an article loading side, from which the article is transferred, and an article unloading side, to which the article is transferred, being designed to run at least in a direction from the loading side to the unloading side, and being divided into a plurality of control zones aligned in series, the control zones consisting of a first end control zone adjacent to the loading side, a second end control zone adjacent to the unloading side, and at least one intermediate control zone between the first and the second end control zones, wherein the conveyor comprises a controller in each of the control zones, at least the controller provided in the intermediate control zone having an arrival detector, a load-presence memorizing means, and a communication tool, the arrival detector being for detecting an article being entering a home control zone from the control zone adjacent to the loading side, the load-presence memorizing means being for memorizing information indicating whether an article exists or not in the home control zone, the communication tool being for transmitting the load presence information to the controller in the control zone adjacent to the loading side, wherein the conveyor further comprises load presence detectors provided in at least the first and the second end control zones, so that articles are moved up to the unloading side and stored in the conveyor, and a motor and a rotary body working with the motor, the motor and the rotary body being arranged in each of the control zones, the arrival detector being designed to detect an article entering the home control zone from the control zone adjacent to the loading side with an induced rotation of the rotary body in the home control zone by an article entering the home control zone as one condition.

23. The conveyor as defined in claim 22, further comprising a carrier detector for detecting approach and/or separation of an external self-propelled carrier in each of the first and second end control zones.

24. The conveyor as defined in claim 22, being designed to automatically move the articles stored in the control zones to the respective control zones adjacent to the unloading side upon unloading of an article in the second end control zone.

25. The conveyor as defined in claim 22, further comprising a motor-reverse switch, the motor-reverse switch being designed to transmit a signal to the controllers, the signal being a command to transfer articles stored in the control zones to the respective control zones adjacent to the loading side.

26. The conveyor as defined in claim 22, the controller in the intermediate control zone driving the conveyor in power activation and/or power fail recovery to press, if any, an article stored in each control zone against another article in the respective control zone adjacent to the unloading side so as to determine whether the article exists in the home control zone.

27. The conveyor as defined in claim 22, further comprising a motor and a rotary body working with the motor, the motor and the rotary body being arranged in each of the control zones, the conveyor further comprising a carrier detector for detecting approach and/or separation of an external self-propelled carrier in each of the first and second end control zones, being designed to automatically move the articles stored in the control zones to the respective control zones adjacent to the unloading side upon unloading of an article in the second end control zone, and further comprising a motor-reverse switch, the motor-reverse switch being designed to transmit a signal to the controllers, the signal being a command to transfer articles stored in the control zones to the respective control zones adjacent to the loading side, and the controller in the intermediate control zone driving the conveyor in power activation and/or power fail recovery to press, if any, an article stored in each control zone against another article in the respective control zone adjacent to the unloading side so as to determine whether the article exists in the home control zone.

28. The conveyor according to claim 22 wherein there is no load presence detector in the one intermediate control zone.

* * * * *